United States Patent
Ogawa et al.

(10) Patent No.: US 10,951,073 B2
(45) Date of Patent: Mar. 16, 2021

(54) ELECTRONIC APPARATUS AND WIRELESS COMMUNICATION METHOD

(71) Applicant: KABUSHIKI KAISHA TOSHIBA, Tokyo (JP)

(72) Inventors: Toshiyuki Ogawa, Kawasaki Kanagawa (JP); Ryoko Matsuo, Tokyo (JP); Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 233 days.

(21) Appl. No.: 16/121,380

(22) Filed: Sep. 4, 2018

(65) Prior Publication Data

US 2019/0252919 A1    Aug. 15, 2019

(30) Foreign Application Priority Data

Feb. 9, 2018    (JP) .............................. JP2018-022252

(51) Int. Cl.
| | |
|---|---|
| *H02J 50/80* | (2016.01) |
| *H02J 50/40* | (2016.01) |
| *H04B 5/00* | (2006.01) |
| *H02J 50/20* | (2016.01) |

(52) U.S. Cl.
CPC .............. *H02J 50/80* (2016.02); *H02J 50/20* (2016.02); *H02J 50/40* (2016.02); *H04B 5/0037* (2013.01)

(58) Field of Classification Search
CPC ...................... H04B 5/0037; B60L 53/12–126
See application file for complete search history.

(56) References Cited

U.S. PATENT DOCUMENTS

| | | | |
|---|---|---|---|
| 8,922,329 B2 | 12/2014 | Davis | |
| 2013/0342161 A1* | 12/2013 | Byun | H02J 50/10 320/108 |
| 2014/0217967 A1* | 8/2014 | Zeine | H02J 50/20 320/108 |
| 2014/0223204 A1* | 8/2014 | Haraguchi | G06F 1/26 713/300 |
| 2016/0094050 A1* | 3/2016 | Shichino | H02J 50/10 307/104 |
| 2016/0211703 A1 | 7/2016 | Eguchi | |
| 2016/0359376 A1* | 12/2016 | Zeine | H02J 50/40 |
| 2017/0358953 A1* | 12/2017 | Trudeau | H04B 5/0037 |
| 2018/0062452 A1* | 3/2018 | Uehara | H02J 50/10 |
| 2018/0175672 A1* | 6/2018 | Yoden | H02J 50/80 |
| 2018/0342905 A1* | 11/2018 | Fukaya | H02J 50/20 |
| 2019/0131827 A1* | 5/2019 | Johnston | H02J 7/025 |
| 2020/0021121 A1* | 1/2020 | Lee | H02J 50/12 |
| 2020/0220390 A1* | 7/2020 | Uchida | H02J 50/60 |

FOREIGN PATENT DOCUMENTS

| | | |
|---|---|---|
| JP | 2013-500693 A | 1/2013 |
| JP | 2015-027228 A | 2/2015 |

* cited by examiner

*Primary Examiner* — Rexford N Barnie
*Assistant Examiner* — David A Shiao
(74) *Attorney, Agent, or Firm* — Foley & Lardner LLP

(57) ABSTRACT

According to one embodiment, an electronic apparatus, includes: transmission circuitry configured to transmit a first request of power feeding; power reception circuitry configured to receive a first wireless signal in response to the first request of power feeding, and charge a rechargeable battery with a power from the first wireless signal; and controlling circuitry configured to determine a transmission timing of a second request of power feeding, based on a reception history of the power reception circuitry.

16 Claims, 18 Drawing Sheets

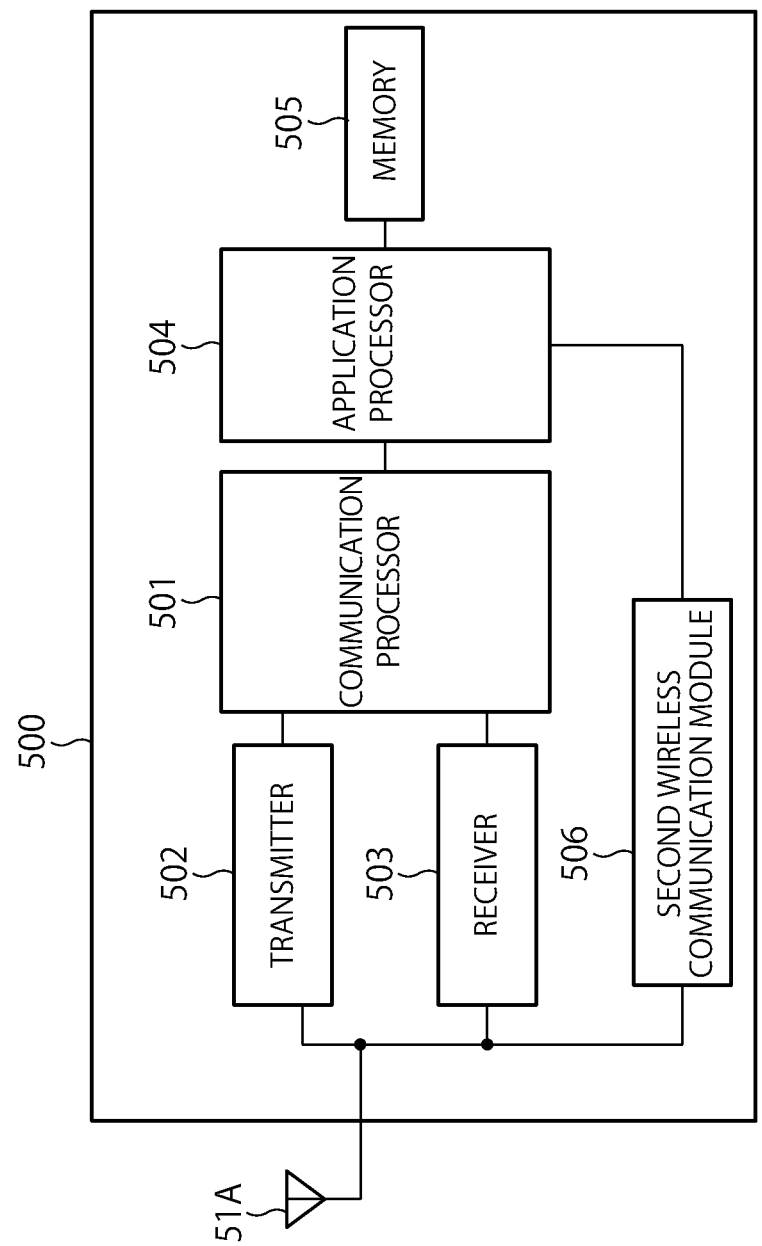

ELECTRONIC APPARATUS AND WIRELESS COMMUNICATION METHOD

CROSS REFERENCE TO RELATED APPLICATIONS

This application is based upon and claims the benefit of priority from the prior Japanese Patent Application No. 2018-022252, filed on Feb. 9, 2018, the entire contents of which are incorporated herein by reference.

FIELD

Embodiments of the present invention relate to an electronic apparatus and a wireless communication method.

BACKGROUND

Wireless power feeding is a technique of achieving power transmission without a cable, through electromagnetic induction, magnetic field resonance, radio waves or the like. Wireless power feeding does not require physical connection of devices. Accordingly, this technique has a high convenience. Furthermore, the risks of leakage and electric shock are reduced. Accordingly, safety can be ensured. According to these advantages, wireless power feeding is becoming widespread, specifically in the fields of mobile and vehicle-mounted devices.

Various schemes of wireless power feeding have been developed. There is, however, a problem of achievement of an efficient power feeding scheme, such as reduction in charging time and increase in transmissible power. Specifically, power feeding through a wireless scheme can feed power from one transmission device to multiple wireless terminals.

Consequently, such wireless feeding is expected to become further widespread.

BRIEF DESCRIPTION OF THE DRAWINGS

FIG. 16 is a functional block diagram of the terminal or the access point;

SUMMARY

Figure 1:
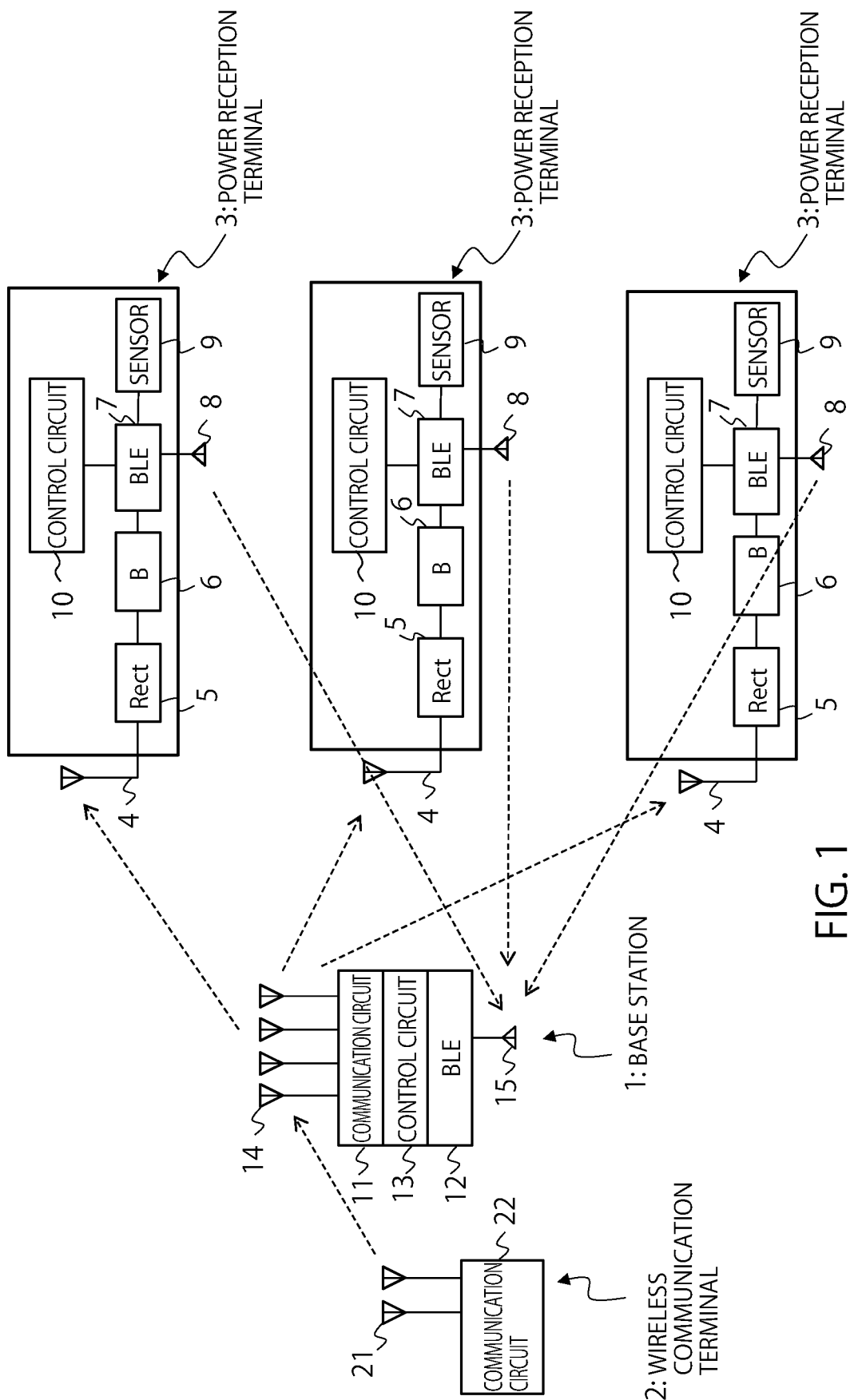
FIG. 1 is a diagram showing a configuration example of an overall system according to a first embodiment.

According to one embodiment, an electronic apparatus, includes: transmission circuitry configured to transmit a first request of power feeding; power reception circuitry configured to receive a first wireless signal in response to the first request of power feeding, and charge a rechargeable battery with a power from the first wireless signal; and controlling circuitry configured to determine a transmission timing of a second request of power feeding, based on a reception history of the power reception circuitry.

DETAILED DESCRIPTION

Hereinafter, referring to the drawings, embodiments of the present invention are described.

First Embodiment

FIG. 1 is a diagram showing a configuration example of an overall system according to this embodiment. Referring to FIG. 1, an overview of this embodiment is described. The system in FIG. 1 includes a base station (power feeding device) 1, a wireless communication terminal 2, and multiple power reception terminals 3. In the diagram, the number of wireless communication terminals 2 is three. However, the number may be any number at least one.

The base station 1 is a wireless communication device (electronic apparatus) that conforms to, for example, an IEEE 802.11 series wireless LAN (Local Area Network) standard or its subsequent standard. The base station 1 is sometimes called an access point (AP). Here, the wireless LAN is an example. The wireless communication scheme used by the base station 1 may be a mobile communication scheme of an IEEE 802.16 series or its subsequent standard or another communication scheme.

The base station 1 can further perform communication through BLE (Bluetooth® Low Energy). The BLE may perform communication other than BLE, for example, Zig-Bee®, Z-Wave®, Wireless USB, wireless LAN communication or the like. NFC (Near field radio communication) or the like is not excluded either.

The base station 1 includes: a communication circuit 11 capable of wireless communication, such as a wireless LAN; a BLE circuit 12 in conformity with BLE; and a control circuit 13. The control circuit 13 performs control of the communication circuit 11 and the BLE circuit 12. The base station 1 includes: an antenna 14 that the communication circuit 11 uses for transmission and reception; and an antenna 15 that the BLE circuit 12 uses for transmission and reception. The number of antennas 14 may be one or more. Any type and shape of the antenna may be adopted. The number of antennas 15 may be one or more. Any type and shape of the antenna may be adopted.

The wireless communication terminal 2 is a wireless communication device that conforms to, for example, an IEEE 802.11 series wireless LAN (Local Area Network) standard or its subsequent standard. The wireless communication terminal 2 may sometimes be called a station (STA). The communication scheme used by the wireless communication terminal 2 may be a mobile communication scheme of an IEEE 802.16 series or its subsequent standard, or another communication scheme. Note that the wireless communication terminal 2 is assumed to conform to a wireless communication scheme identical to or compatible with the wireless communication scheme that the base station 1 uses.

The wireless communication terminal 2 includes one or more antennas 21, and a communication circuit 22.

Each power reception terminal 3 is a wireless communication device capable of communication through BLE. Each power reception terminal 3 includes an antenna 4, a rectifier circuit 5, a rechargeable battery 6, a BLE circuit 7, an antenna 8 for BLE, a sensor 9, and a control circuit 10. The antenna 4 and the rectifier circuit 5 integrally operate as a rectenna (rectifying antenna). The rechargeable battery 6 can accumulate and release power (charges). The rechargeable battery 6 may be a small secondary battery (rechargeable battery), such as a lithium-ion battery, or a capacitor. This embodiment assumes a rechargeable battery. The rechargeable battery 6 is hereinafter denoted as a rechargeable battery 6. The BLE circuit 7 provides a communication function mainly through BLE.

In this embodiment, the description is made assuming that the communication circuit 11 of the base station 1 and the communication circuit 22 of the wireless communication terminal 2 communicate through a wireless LAN. Note that the wireless LAN is an example, which does not exclude use of another wireless communication scheme.

The description is made assuming that the base station 1, the wireless communication terminal 2, and each power reception terminal 3 are devices mounted on an automobile. Note that the automobile is an example. The devices may be on another mobile unit, such as a railroad vehicle, a ship, aircraft, a construction machine, or a robot, or on facilities, such as a power plant or a factory. The installation place is not specifically limited.

The wireless communication terminal 2 is a vehicle-mounted camera, for example. Each power reception terminal 3 is any of various types of monitor sensors, for example. Specific examples of the monitor sensor include a tire pneumatic sensor, an engine temperature sensor, and a room temperature sensor. However, the sensor is not limited thereto.

The base station 1 and the wireless communication terminal 2 operate by a battery mounted on an automobile or batteries mounted on the devices themselves. The battery may be a primary battery or a secondary battery.

The BLE circuit 7 in the power reception terminal 3 operates by the power accumulated in the rechargeable battery 6. The sensor 9 operates by the power accumulated in the rechargeable battery 6. The power reception terminal 3 receives, through the antenna 4, a wireless signal (power feeding signal) transmitted through the wireless LAN from the base station 1. The power reception terminal 3 converts the received wireless signal into DC energy by the rectifier circuit 5, and accumulates the DC energy in the rechargeable battery 6.

The control circuit 10 controls the BLE circuit 7. The control circuit 10 determines the timing (transmission timing) for transmitting a request of power feeding (a power feeding request) to the base station 1, and transmits the request of power feeding to the base station 1 via the BLE circuit 7 according to the determined transmission timing.

As an example of the operation of the system in FIG. 1, the base station 1 receives video data periodically or at any timing from the wireless communication terminal 2. The base station 1 stores the received video data in an internal storage device, displays the data on a display device (for example, a screen of a path guide device), not shown, or executes image analysis.

The base station 1 wirelessly feeds power to the power reception terminal 3 by transmitting the wireless signal for wireless power feeding (power feeding signal) in response to the power feeding request issued by the power reception terminal 3. In this case, the base station 1 may perform wireless power feeding through the beam by transmitting, to the power reception terminal 3, a beam that is radio waves having a directivity according to weights set for the respective antennas 14. The base station 1. The beam is generated by weighting the signal and combines the components weighted for the respective antennas 14. In a case where the antennas themselves have a variable directivity, the directivity of radio waves may be controlled by adjusting the antenna setting.

The base station 1 performs BLE communication, and periodically collects sensor data from the power reception terminal 3 and collects information pertaining to the amount of received power of the power reception terminal 3 (received power amount information). The base station 1 may control power feeding to the power reception terminal 3 using the received power amount information. For example, the control includes the control of the weights for antennas for the beam for transmission to the power reception terminal 3, the control of the modulation scheme, the control of the wireless frequency channel to be used (hereinafter, the channel), the control of the bandwidth to be used and the like. The base station 1 may calculate the power transmission efficiency (power reception efficiency) using the received power amount information. The power transmission efficiency (power reception efficiency) can be calculated from the ratio of the amount of received power to the amount of transmission power, for example. The amount of power is the electric energy, or the quantity of electric charges. The wireless signal (power feeding signal) transmitted by the base station 1 may be continuous waves (i.e., is not necessarily a signal conforming to the format defined according to a standard, such as BLE or wireless LAN), or may be a signal conforming to the frame format of a standard, such as of wireless LAN.

In the following description, the frequency band used by the wireless LAN is different from the frequency band used by BLE. For example, the wireless LAN uses 5 GHz band, and the BLE, which is a type of Bluetooth, uses 2.4 GHz band. Note that the wireless LAN may use the 2.4 GHz identical to that of BLE, and the frequency bands of the wireless LAN and BLE may overlap each other.

The power reception terminal 3 according to this embodiment has a characteristic of transmitting the request of power feeding to the base station 1 at an appropriate timing, thereby wirelessly feeding power from the base station 1 efficiently. The base station 1 and the wireless communication terminal 2 operate with the energy from the battery of an automobile. Consequently, the energy is fed upon start of the engine, and the operation becomes possible immediately.

Meanwhile, the power reception terminal 3 charges the rechargeable battery 6 with the power from the wireless signal received from the base station 1, and operates. Accordingly, the terminal is required to be appropriately charged. At this time, the minimum amount of power of the rechargeable battery 6 is sometimes required to be maintained. The base station 1 feeds power to and communicates with one or more power reception terminals 3, and communicates with one or more wireless communication terminals 2. Consequently, the power reception terminal 3 does not necessarily preliminarily recognize the timing when the wireless signal is transmitted from the base station 1 to the terminal itself after transmission of the request of power feeding. The length and the number of transmissions of the wireless signal are not preliminarily recognized either in some cases. In such situations, the power reception terminal 3 issues the request of power feeding at the appropriate timing, thereby maintaining the minimum amount of power of the rechargeable battery 6 and completing power feeding by a predetermined time point. In this embodiment, the reception situation of the wireless signal from the base station 1 after transmission of the request of power feeding is predicted, and the transmission timing of the request of power feeding is determined in consideration of the prediction.

Hereinafter, the base station 1, the wireless communication terminal 2 and the power reception terminals 3 in FIG. 1 are described in further detail.

Figure 2:
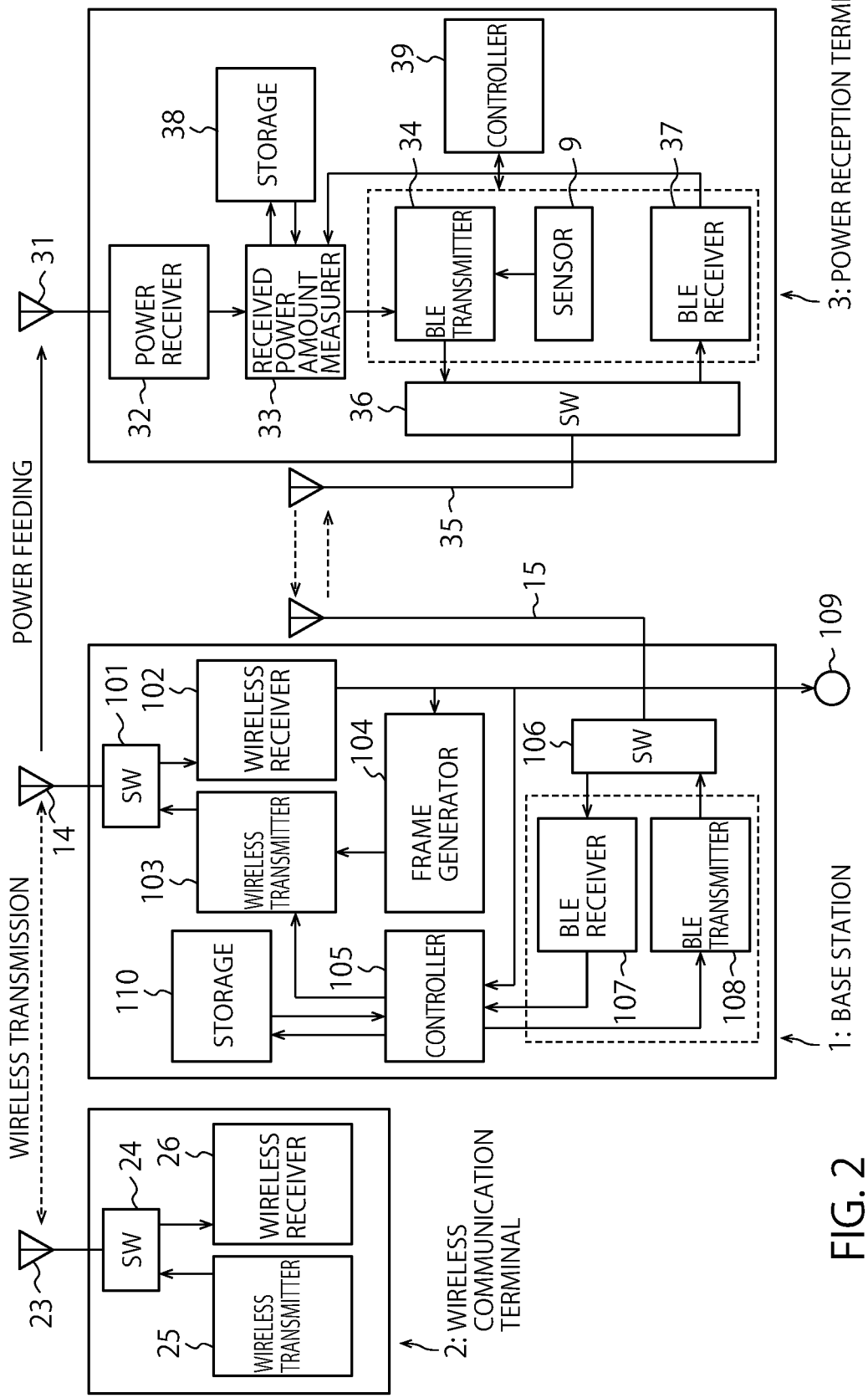
FIG. 2 is a block diagram of a wireless communication system according to the first embodiment.

FIG. 2 is a block diagram of a wireless communication system according to the first embodiment. In this embodiment, elements having common names in each diagram are assigned the same symbols. Redundant description is appropriately omitted.

The wireless communication system according to this embodiment includes the base station 1, the wireless communication terminal 2, and the power reception terminals 3. FIG. 2 shows a single power reception terminals 3. In actuality, multiple terminals may reside (see FIG. 1).

The wireless communication device (electronic apparatus) mounted on the base station 1 includes: one or more antennas 14 for wireless communication, one or more antennas 15 for BLE, a switch 101, a wireless receiver 102, a wireless transmitter (transmission circuitry) 103, a frame generator 104, a controller 105, a switch 106, a BLE receiver 107, a BLE transmitter 108, an IF 109, and a storage 110. The controller 105 corresponds to controlling circuitry as one example.

The switch 101 is a switch for switching the antenna 14 between the wireless transmitter 103 and the wireless receiver 102.

The frame generator 104 generates a frame for transmission to the wireless communication terminal 2. In a case where the base station 1 communicates through the wireless LAN, the frame is a MAC frame. The wireless LAN standard frames include a data frame, a management frame and a control frame, and may be any of these frames.

The beacon frame that the base station 1 periodically transmits for notifying the attribute of the base station itself or synchronization information is a management frame. The control frame includes an RTS (Request to Send) frame for issuing a transmission request to the opposite terminal, a CTS (Clear to Send) frame for providing a transmission permission, and an ACK frame or a BA (Block Ack) frame that serves as an acknowledgement frame. The frames listed here are only examples. There are other various frames.

The wireless transmitter 103 transmits the frame generated by the frame generator 104, through the antennas 14. In actuality, a header on a physical layer is added to the frame to form a packet, and the packet is transmitted. The wireless transmitter 103 error-correcting encodes and modulates the frame (more specifically, the packet), and generates a modulated signal. The modulated signal is converted into an analog signal. The wireless transmitter 103 uses an oscillator and a PLL (Phase Locked Loop) circuit to generate a signal having a certain frequency, and causes a transmission mixer to up-convert the analog signal into a signal having a wireless frequency on the basis of the signal having the certain frequency. The wireless transmitter 103 causes an RF amplifier to amplify the up-converted signal, and transmits the amplified signal as radio waves through the antennas into the air. Accordingly, the frame (packet) through the wireless frequency is transmitted.

Under control of the controller 105, the wireless transmitter 103 generates a wireless signal for wireless power feeding (power feeding signal), and transmits the wireless signal through the antennas 14. Specifically, the wireless transmitter 103 generates a wireless signal according to a power feeding parameter designated by the controller 105. The wireless signal can be generated using an output signal of the oscillator to be used during transmission of the frame or packet, or an output signal of the PLL circuit. For example, power feeding data according to the power feeding parameter is mixed with the output signal by the transmission mixer to generate the wireless signal. A signal source for the wireless signal may be prepared, and the wireless signal can be generated based on the power feeding parameter using the signal source.

The frame generated by the frame generator 104 may be used as the wireless signal to be transmitted to the power reception terminal 3. For example, the beacon frame can be used as a wireless signal. Alternatively, the frame for wireless power feeding may be defined, and the frame may be transmitted as the wireless signal.

The controller 105 controls communication with the wireless communication terminal 2 using the frame generator 104.

The controller 105 controls the setting of the power feeding parameter. An example of setting items is weights for the respective antennas. Another example is a modulation scheme or a modulation and coding scheme (MCS). Yet another example is a channel to be used. For example, the channel is a channel to be used among multiple channels residing in the wireless LAN band.

The weight means an adjustment value for the amplitude or the phase of the transmission signal. Various beams can be formed by adjusting the amplitude and the phase of the signal to be transmitted with respect to the individual antennas. Formation of a beam suitable for the power reception terminals 3 can achieve wireless signal transmission with a high transmission efficiency. The transmission efficiency is the ratio of the amount of received power to the amount of transmission power.

The setting of weights for the respective antennas that can form a beam preferable for the power reception terminals 3 (a beam having high transmission efficiency) is not preliminarily determined in many cases. Accordingly, the wireless signal is transmitted with various weights, and pieces of received power amount information are fed back, thereby allowing the weights suitable for the respective power reception terminals 3 to be determined.

The setting items of the power feeding parameter described above are only examples. Other various items can be controlled.

The wireless receiver 102 demodulates the signal received from the wireless communication terminal 2 to obtain the frame. More specifically, the signal received by the antennas 14 is input into the wireless receiver 102. The wireless receiver 102 causes an LNA (Low Noise Amplifier) amplifier to amplify the received signal. The wireless receiver 102 extracts a signal in a desired band from the amplified signal using a reception filter. The wireless receiver 102 downconverts the extracted signal on the basis of a signal that is in a certain frequency and is generated by the oscillator and the PLL circuit. The wireless receiver 102 applies demodulation and decoding to obtain the frame.

If the obtained frame is a data frame, the wireless receiver 102 outputs the data included in the data frame through the IF 109. The IF 109 is an interface for outputting the frame received by the wireless receiver 102, to an upper layer or a buffer between this interface and the upper layer. The wireless receiver 102 outputs a frame analysis result to the frame generator 104 or the controller 105 so as to perform the operation according to the type of the received frame. For example, in the case of issuing an acknowledgement response, information required for the acknowledgement response is output to any or both of the frame generator 104 and the controller 105, thus allowing the acknowledgement response frame to be received after a certain time period has passed from completion of receipt.

The switch 106 is a switch for switching the antenna 15 between the BLE receiver 107 and the BLE transmitter 108.

The BLE receiver 107 receives a BLE signal. The BLE receiver 107 receives data from the power reception terminal 3 through the antenna 15 for BLE. Examples of the received data include a request of power feeding, sensor data, and information (received power amount information) pertaining to the amount of received power received by the power reception terminal 3.

The BLE receiver 107 is connected to the controller 105, and supplies the controller 105 with the request of power feeding and the received power amount information received from the power reception terminal 3. The BLE receiver 107 transmits the sensor data received from the power reception terminal 3, to a monitoring device (not shown) in the vehicle. The monitoring device verifies the presence or absence of an abnormality at a sensing site on the basis of the sensor data. The controller 105 may also play the role of the monitoring device. In this case, the BLE receiver 107 supplies the sensor data to the controller 105.

The BLE transmitter 108 is connected to the controller 105, and transmits the data to the power reception terminals 3 through the antenna 15. Examples of the data to be transmitted from the BLE transmitter 108 to the power reception terminal 3 include the power feeding parameter (the weights for the respective antennas used for transmission from the base station 1, their transmission powers, etc.).

The storage 110 is connected to the controller 105, and stores control data. The storage 110 may be a volatile memory, such as SRAM or DRAM, or a nonvolatile memory, such as NAND, MRAM or FRAM. This storage may be a storage device, such as a hard disk or an SSD.

The wireless transmitter 103, the wireless receiver 102 and the frame generator 104 in the base station 1 corresponds to the communication circuit 11 in the base station 1 shown in FIG. 1, for example. The controller 105 in the base station 1 corresponds to the control circuit 13 in the base station 1 shown in FIG. 1, for example. The BLE receiver 107 and the BLE transmitter 108 in the base station 1 correspond to the BLE circuit 12 in the base station 1 shown in FIG. 1, for example.

The wireless communication device mounted on the wireless communication terminal 2 includes an antenna 23, a switch 24, a wireless transmitter 25, and a wireless receiver 26. The switch 24 is a switch for switching the antenna 23 to the wireless transmitter 25 or the wireless receiver 26. The wireless transmitter 25 transmits a MAC frame generated by the wireless communication terminal 2, through the antennas 23. The wireless receiver 26 receives the MAC frame from the base station 1 and another wireless communication terminal.

The antenna 23 is an antenna that can transmit and receive a wireless LAN signal. The wireless transmitter 25 and the wireless receiver 26 have functions analogous to those of the wireless transmitter 103 and the wireless receiver 102 in the base station 1. The wireless transmitter 25 and the wireless receiver 26 correspond to the communication circuit 22 included in the wireless communication terminal 2 in FIG. 1, for example.

The wireless communication device mounted on the power reception terminal 3 includes a sensor 9, an antenna 31 for wireless LAN, a power receiver (power reception circuitry) 32, a received power amount measurer 33, a BLE transmitter 34, a BLE antenna 35, a switch 36, a BLE receiver 37, a storage 38, and a controller 39.

The power receiver 32 receives, through the antenna 31, the wireless signal (power feeding signal) transmitted from the base station 1, and converts (rectifies) the received wireless signal into direct current. The power receiver 32 charges the rechargeable battery 6 with the converted direct current.

The received power amount measurer 33 measures the amount of power (amount of received power) of the received wireless signal. The method of measuring the amount of received power may be any method. For example, the amount of received power may be obtained according to the change in voltage before and after measurement. Specifically, the amount of received power is measured from the difference between voltages before and after measurement and from the battery capacity. Information pertaining to the measured amount of received power is stored in the storage 38.

The BLE transmitter 34 performs communication through BLE. The BLE transmitter 34 transmits the information pertaining to the measured amount of received power (received power amount information) through the BLE antenna 35. The received power amount information includes a value for specifying the measured amount of received power, for example. The value for specifying the amount of received power may be the value of the amount of received power, or the value of change in the voltage of the rechargeable battery 6 before and after measurement. In a case where the characteristics of the rechargeable battery 6 can be grasped by the base station 1, the amount of received power can be calculated by the base station 1 from the value of change in voltage. By feeding back the received power amount information to the base station 1, the base station 1 can determine efficient weights for the antennas 14 for the power reception terminal 3. Changing the weights for the antennas 14 using the received power amount information is an example of the operation. The base station 1 does not necessarily perform such weight control. In this case, the measurement of the amount of received power at the power reception terminal 3 may be omitted.

The switch 36 is a switch for switching the antenna 35 between the BLE transmitter 34 and the BLE receiver 37.

The BLE receiver 37 receives a BLE signal. The BLE receiver 37 receives data from the base station 1 through the antenna 35 for BLE. For example, the BLE receiver 37 receives, from the base station 1, the measurement instruction information or the power feeding parameter.

The storage 38 stores the information pertaining to the measured amount of received power measured by the received power amount measurer 33 (received power amount information), or any data. The storage 38 may be a volatile memory, such as SRAM or DRAM, or a nonvolatile memory, such as NAND, MRAM or FRAM, or a storage device, such as a hard disk or an SSD, or a combination thereof.

The controller 39 controls the received power amount measurer 33, the BLE transmitter 34, the BLE receiver 37, and the sensor 9. The controller 39 transmits a request of power feeding, through the BLE transmitter 34 to the base station 1. The request of power feeding includes, for example, at least one setting value among the amount of transmission power fed from the base station 1 (power feeding amount), the number of transmissions of the wireless signal, the total time length of the wireless signal transmitted for power feeding, the length of the wireless signal per transmission, the value of transmission power, etc. In a case where some of these setting values are predefined according to the system or specifications, the predefined setting values are not necessarily included in the request of power feeding. The controller 39 determines the transmission timing of the next request of power feeding on the basis of the reception history of the wireless signal from the base station 1 after transmission of the request of power feeding (for example, an elapsed time from transmission of the request of power feeding to reception of the wireless signal or the like). For example, the transmission timing may be a timing when the remaining amount of power of the rechargeable battery 6 becomes a threshold or less, or a timing when a predetermined time point is reached. Note that the transmission timing is not limited thereto. For example, the timing may be a timing when a predetermined time elapses from a time point as a reference. The controller 39 transmits the next request of power feeding via the BLE transmitter 34 at the determined timing.

The antenna 31 and the power receiver 32 in the power reception terminal 3 correspond to the antenna 4, the rectifier circuit 5 and the rechargeable battery 6 in the power reception terminal 3 in FIG. 1, for example. The received power amount measurer 33, the BLE transmitter 34 and the BLE receiver 37 in the power reception terminal 3 correspond to the BLE circuit 7 in the power reception terminal 3 in FIG. 1, for example. The controller 39 corresponds to the control circuit 10 in the power reception terminal 3 in FIG. 1, for example.

Figure 3:
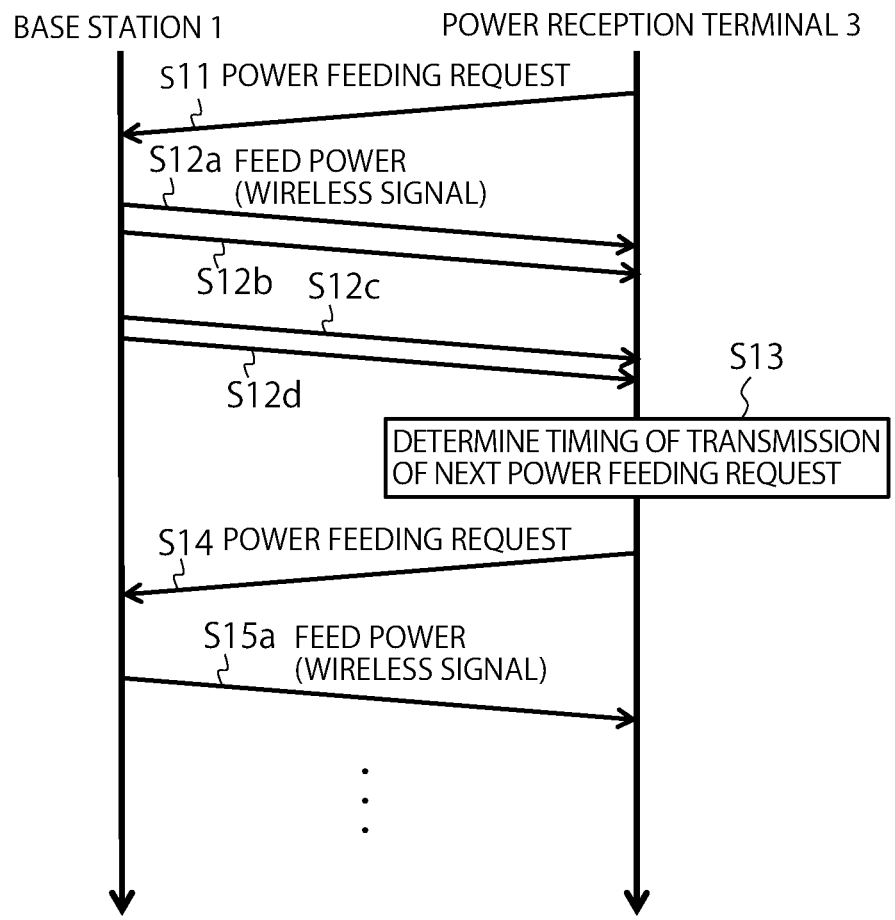
FIG. 3 is a sequence diagram of the wireless communication system in FIG. 2.

FIG. 3 shows an overview of the operation sequence between the base station 1 and the power reception terminal 3.

The power reception terminal 3 transmits the request of power feeding (a power feeding request or a first request of power feeding) through BLE to the base station 1 at a predetermined timing or any timing (S11).

Upon receipt of the first request of power feeding through BLE from the power reception terminal 3, the base station 1 performs a power feeding process to the power reception terminal 3 using the wireless transmitter 103 according to the first request of power feeding. For example, in a case where the power feeding amount is designated, the wireless signal length capable of feeding the designated power feeding amount is calculated on the basis of the preliminarily measured power transmission efficiency, and the wireless signal having the calculated length is transmitted. In a case where the maximum length of the wireless signal is defined, the wireless signal may be transmitted multiple times in a divided manner as required, so as not to exceed the maximum length. The transmission power of the wireless signal may be predetermined, or be designated by the first request of power feeding. According to the example in the diagram, an example of transmitting the wireless signal four times is shown (S12a, S12b, S12c and S12d). However, the number of transmissions of the wireless signal may be any number only if the number is one or more.

The time from transmission of the first request of power feeding to transmission of the wireless signal by the base station 1 varies dependent on the operation situations of the base station 1 and the radio wave environments therearound and the like. The same applies to the number of transmissions of the wireless signal from the base station 1, and the interval of wireless signals in the case where the wireless signal is transmitted multiple times. For example, after reception of the first request of power feeding, the base station 1 communicates with the wireless communication terminal 2 and then executes the first request of power feeding, in a certain case. Alternatively, upon receipt of the first request of power feeding, this station immediately executes the first request of power feeding, in another case. If the network is not congested, the wireless signal in response to the first request of power feeding can be immediately transmitted. However, if congested, transmission of the wireless signal is required to be waited until the wireless medium becomes idle. According to the example in the diagram, the transmission interval between the wireless signals in steps S12b and S12c is larger than the transmission interval between the wireless signals in steps S12a and S12b and the transmission interval of the wireless signals in steps S12c and S12d.

After transmission of the first request of power feeding in step S11, the power reception terminal 3 measures the situations of receiving the wireless signal received from the base station 1, thereby obtaining the reception history of the wireless signal (i.e., the situations of executing charging at the power reception terminal 3). The power reception terminal 3 determines the transmission timing of the next request of power feeding (a second request of power feeding) on the basis of the reception history of the wireless signal (S13). The power reception terminal 3 transmits the second request of power feeding through BLE at the determined timing (S14). The power reception terminal 3 receives the wireless signal transmitted from the base station 1 in response to the second request of power feeding (S15a).

Figure 4:
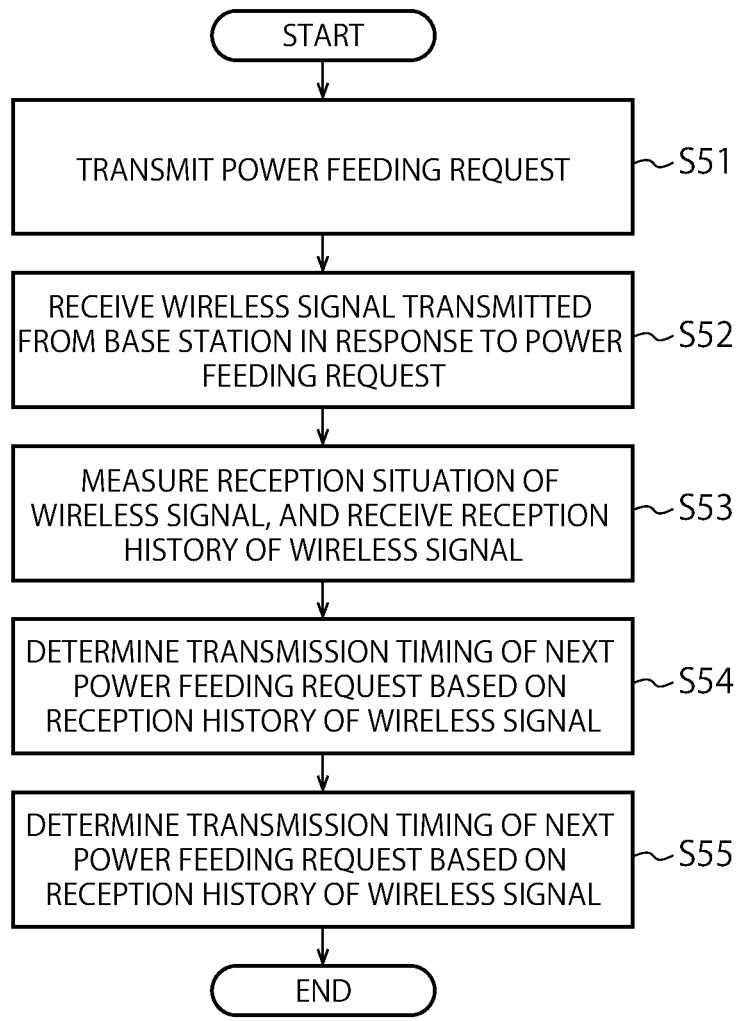
FIG. 4 is a flowchart of a power reception terminal according to the first embodiment.

FIG. 4 is a flowchart of the operation of the power reception terminal 3 in the operation sequence of FIG. 3. The power reception terminal 3 transmits the request of power feeding (a power feeding request or a first request of power feeding) through BLE to the base station 1 at a predetermined transmission timing or any timing (S51). The power reception terminal 3 receives the wireless signal transmitted from the base station 1 in response to the first request of power feeding (S52). The power reception terminal 3 measures the situations of receiving the wireless signal, thereby obtaining the reception history of the wireless signal (S53). The power reception terminal 3 determines the transmission timing of the next request of power feeding (a next power feeding request or a second request of power feeding) on the basis of the reception history of the wireless signal (S54). The power reception terminal 3 transmits the second request of power feeding at the determined transmission timing (S55).

Hereinafter, referring to FIGS. 5 to 12, first to sixth specific examples about the operation of the sequence described with reference to FIG. 3 are described.

First Specific Example

Figure 5:
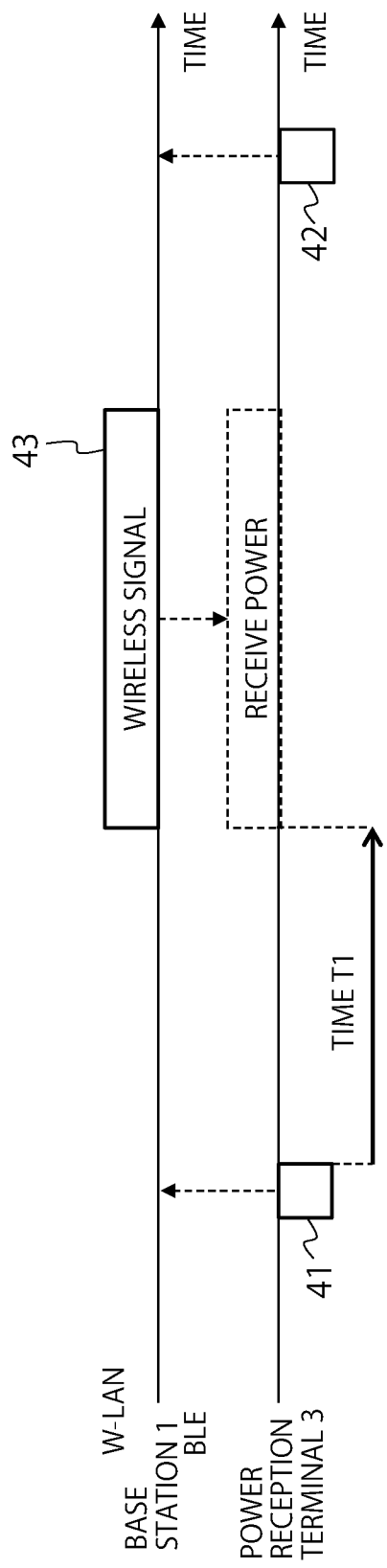
FIG. 5 is a diagram showing a first specific example of an operation sequence according to the first embodiment.

FIG. 5 shows a first specific example of the operation sequence in the wireless communication system according to this embodiment. The operations of the base station 1 and the power reception terminal 3 are indicated along temporal axes. The upper temporal axis indicates the operation of the wireless LAN, and the lower temporal axis indicates the operation of BLE. In this example, the power reception terminal 3 obtains information indicating the time length from transmission of the request of power feeding by the power reception terminal 3 to the start of receiving the wireless signal from the base station 1, and determines the transmission timing of the next request of power feeding on the basis of the obtained information.

The power reception terminal 3 transmits the request of power feeding 41 through BLE at the predetermined timing. Examples of the predetermined timing include a case where the remaining amount of power of the rechargeable battery 6 becomes a threshold or less, and a case where a predetermined time point is reached (or a predetermined duration is entered). Here, the case where the remaining amount of power of the rechargeable battery 6 becomes the threshold or less is assumed. The threshold is, for example, a value larger than the minimum amount of power that should be maintained at the rechargeable battery 6. Another example of the timing may be a timing immediately after activation.

The base station 1 receives the request of power feeding 41 through BLE, and analyzes the request of power feeding 41. Here, the request of power feeding 41 designates the amount of transmission power (power feeding amount), and the base station 1 determines to feed the amount of power designated by the request of power feeding 41. The base station 1 determines the length of the wireless signal to be transmitted so that the power reception terminal 3 can be fed with the amount of power of a value obtained by multiplying the preliminarily measured power reception efficiency and the amount of transmission power together. The transmission power value is assumed to be predetermined. In a case where the transmission power value is designated by the request of power feeding 41, the designated transmission power value is used.

The base station 1 obtains the access right to the wireless medium according to CSMA/CA (Carrier Sense Multiple Access with Collision Avoidance). Specifically, carrier sense is performed during a standby time that is the total of a fixed time and a randomly determined backoff time. When the state of the wireless medium is determined to be idle, the access right is obtained. The base station 1 transmits the wireless signal 43 having the length determined as described above through the wireless LAN on the basis of the obtained access right. The base station 1 may weight the signal with the weights set for the respective antennas 14, and wirelessly feed power to the power reception terminal 3 through a beam.

The power reception terminal 3 receives the wireless signal 43 transmitted from the base station 1, and charges the rechargeable battery 6 with the power of the received wireless signal 43.

The power reception terminal 3 measures a time "T1" from transmission of the request of power feeding 41 to start of receiving the wireless signal 43.

The power reception terminal 3 determines the transmission timing of the next request of power feeding 42 on the basis of the time "T1". The time "T1" can be estimated as a time (power feeding response time) after transmission of the request of power feeding until the start of receiving the wireless signal. The power reception terminal 3 changes the threshold for transmitting the request of power feeding, on the basis of the operation power consumption of the power reception terminal 3 (e.g., the average power consumption) and the power feeding response time "T1". Specifically, the amount of power consumption to be consumed by the power reception terminal 3 in a time identical to the power feeding response time "T1" is calculated, and a value obtained by adding the calculated amount of power consumption to the minimum amount of power of the rechargeable battery 6 is determined as the threshold (i.e., the threshold is updated). At this time, in consideration of a margin, a value obtained by adding the calculated amount of power consumption and an amount of margin power a to the minimum amount of power may be determined as the threshold. In this case, when the remaining amount of power of the rechargeable battery 6 becomes the changed threshold or less, the power reception terminal 3 transmits the next request of power feeding 42 through BLE. Accordingly, it is expected that the power reception terminal 3 can be charged while maintaining the minimum amount of power of the rechargeable battery 6.

Alternatively, the power reception terminal 3 adds, to the minimum amount of power, an amount of power consumption to be consumed in a time identical to the power feeding response time "T1", and calculates a time point (first time point) when the remaining amount of power of the rechargeable battery 6 reaches the amount of power achieved by the addition, on the basis of the operation power consumption of the power reception terminal 3. The first time point may then be adopted as the transmission time point of the next request of power feeding 42. Here, a time point (second time point) when the remaining amount of power reaches an amount of power obtained by further adding the amount of margin power a to the amount of power obtained by the above addition may be calculated, and the second time point may be adopted as the transmission time point of the next request of power feeding 42. When the first time point or the second time point is reached, the power reception terminal 3 transmits the next request of power feeding 42. Alternatively, the power reception terminal 3 may set a duration from the second time point to the first time point, and adopt this duration as the transmission duration of the next request of power feeding 42. In this case, the power reception terminal 3 transmits the next request of power feeding 42 in the determined transmission duration. Accordingly, it is expected that the power reception terminal 3 can charge the rechargeable battery 6 while maintaining the minimum amount of power of the rechargeable battery 6.

Here, in the sequence of FIG. 5, there is a case where after transmission of the request of power feeding 41 and before the start of receiving the wireless signal 43, the power reception terminal 3 receives a signal (noise signal) transmitted from another system, a wireless signal transmitted by the base station 1 to another power reception terminal, or a signal transmitted by another power reception terminals 3.

Figure 6:
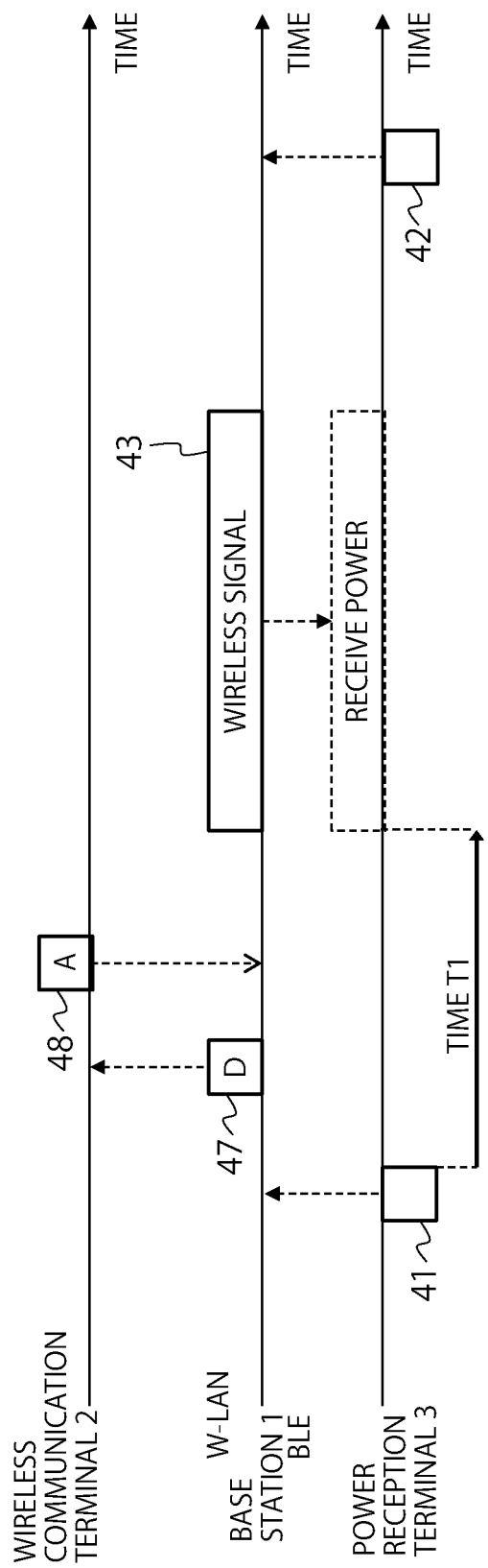
FIG. 6 is a diagram showing a first specific example of an operation sequence according to the first embodiment.

For example, FIG. 6 shows a sequence in a case where after reception of the request of power feeding 41 and before transmission of the wireless signal 43, the base station 1 communicates with the wireless communication terminal 2. After receipt of the request of power feeding 41 from the power reception terminal 3, the base station 1 transmits a data frame 47 to the wireless communication terminal 2. "SIFS"-after receipt of the data frame 47, the wireless communication terminal 2 transmits an acknowledgement response frame (ACK frame) 48 as a response. There is a possibility that the data frame 47 or the acknowledgement response frame 48, or both of these frames are received or detected also by the power reception terminal 3.

The power reception terminal 3 may include a measure of determining whether the received wireless signal 43 pertains to the request of power feeding 41 or not. For example, when a received signal having an electric value of at least a predetermined value continues for a certain duration or longer, the received signal may be determined as a wireless signal pertaining to the request of power feeding 41. In this case, a requirement that the received signal is within a certain duration after transmission of the request of power feeding 41 may be added. Alternatively, in a case where the wireless signal for power feeding has a frame with a wireless LAN format, it may be determined whether the reception destination address of frame of the received wireless signal is the MAC address of the terminal itself or not, and if the address is the MAC address of the terminal itself, it may be determined that the received wireless signal pertains to the request of power feeding 41. The determination may be made by a method other than that described here.

The timing when the base station 1 executes the request of power feeding received from the power reception terminal 3 is not limited to a specific timing. For example, there is a case where the base station 1 receives the request of power feeding not only from the power reception terminal 3 shown in FIG. 5 or 6 but also from other one or more power reception terminals 3. In this case, the base station 1 may execute the request of power feeding in the earlier receiving order. Alternatively, the execution order may be controlled according to another criterion.

The base station 1 communicates also with the wireless communication terminal 2 other than the power reception terminal 3 in some cases.

In this case, the communication with the wireless communication terminal 2, and the execution of the request of power feeding may be scheduled according to any method. For example, in an order of occurrence (or reception) of the communication request and the request of power feeding, the request and the request of power feeding may be issued and executed. Alternatively, transmission or reception of a certain number of frames (e.g., one) to or from the wireless communication terminal 2 is regarded as one task, and one transmission of the wireless signal according to the request of power feeding is regarded as one task (when a wireless signal with multiple requests of power feeding is transmitted, the number of tasks is two or more). The task execution may be scheduled so that the request of power feeding by the power reception terminal 3, the request of power feeding by another power reception terminal 3, and communication with the wireless communication terminal 2 can be sequentially executed on a one-task-at-a-time basis.

Second Specific Example

Figure 7:
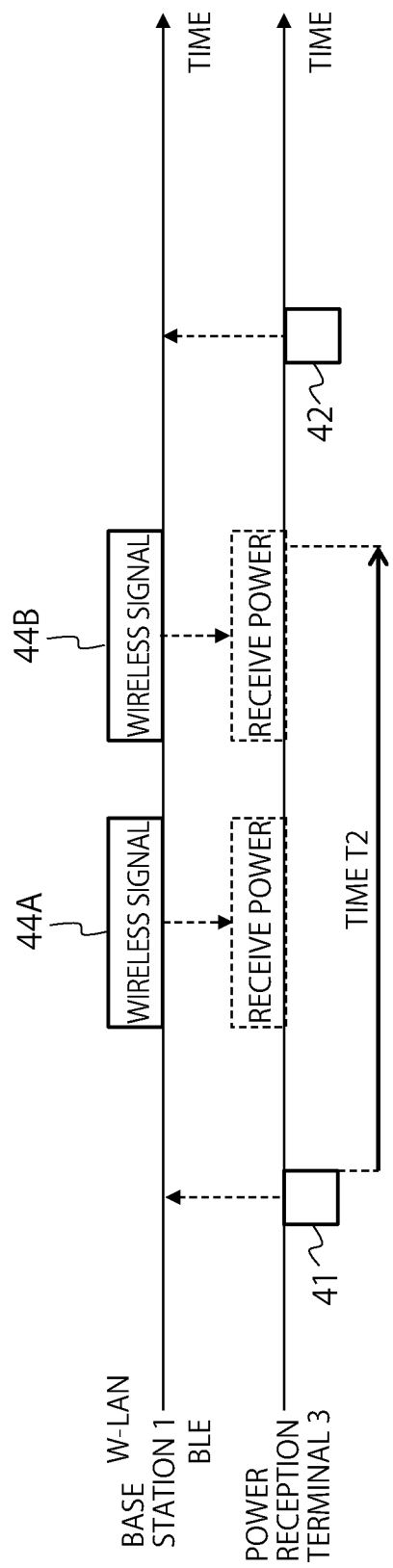
FIG. 7 is a diagram showing a second specific example of the operation sequence according to the first embodiment.

FIG. 7 shows a second specific example of the operation sequence in the wireless communication system according to this embodiment. The operations of the base station 1 and the power reception terminal 3 are indicated along temporal axes. The upper temporal axis indicates the operation of the wireless LAN, and the lower temporal axis indicates the operation of BLE. In this example, the power reception terminal 3 obtains the time (charge completion time) until completion of receiving the wireless signal pertaining to the request of power feeding after transmission of the request of power feeding, and determines the transmission timing of the next request of power feeding on the basis of the obtained information. Description of the operation identical to that of the sequence of FIG. 5 is appropriately omitted.

The power reception terminal 3 transmits the request of power feeding 41 through BLE at the predetermined timing.

The base station 1 receives the request of power feeding 41 through BLE, and analyzes the request of power feeding 41. Here, the request of power feeding 41 designates the amount of transmission power (power feeding amount), the number of transmissions or the like. The base station 1 determines the number of transmissions and the length of the wireless signal on the basis of the information designated by the request of power feeding 41.

In the case where the power feeding amount is designated by the request of power feeding 41, the base station 1 transmits the wireless signal multiple times in a divided manner if the length of the wireless signal required to transmit the power feeding amount exceeds the maximum frame length of one packet (or physical packet). Alternatively, the length of the wireless signal may be changed according to the communication environment and the radio wave environment therearound. For example, in a case where the number of power reception terminals to be fed with power is large, the wireless signal length may be shortened or enlarged instead. Alternatively, when the network congestion degree is high (for example, the busy rate of carrier sense is high), the wireless signal length may be shortened or enlarged instead.

In a case where the number of transmissions is designated by the request of power feeding 41, the length of the wireless signal per transmission may be predetermined or wireless signal length per transmission may be designated by the request of power feeding 41.

Here, the base station 1 determines to transmit the wireless signal twice, and appropriately determines each length.

The base station 1 obtains the access right to the wireless medium according to CSMA/CA, and transmits a wireless signal 44A through wireless LAN on the basis of the obtained access right. Furthermore, the base station 1 transmits the wireless signal 44A, subsequently obtains the access right to the wireless medium again, and transmits a wireless signal 44B through wireless LAN on the basis of the obtained access right.

Here, to transmit the wireless signals 44A and 44B, the respective access rights to the wireless medium are obtained. Alternatively, as another method, TXOP (Transmission Opportunity) having a duration length required to transmit these two wireless signals may be obtained, and the two wireless signals may be sequentially transmitted at a predetermined time interval on the basis of the obtained TXOP.

Figure 8:
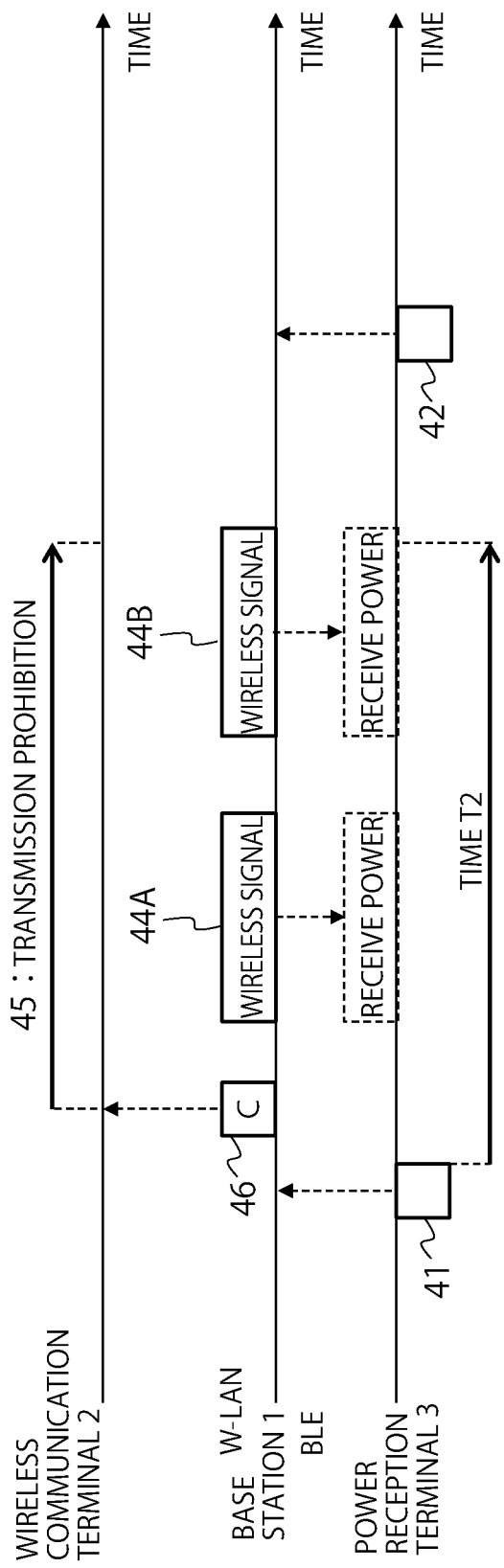
FIG. 8 is a diagram showing the second specific example of the operation sequence according to the first embodiment.

FIG. 8 shows an example of obtaining TXOP by the base station 1 transmitting a CTS frame (CTS-to-self frame) 46 destined for the station itself. In this case, the duration length to be secured is designated as TXOP in a "Duration/ID" field of a CTS frame 46. The wireless communication terminal 2 having received the CTS frame 46 suppresses transmission for the designated duration 45 after receipt of the CTS frame 46. That is, the wireless communication terminal 2 sets NAV (Network Allocation Vector) for the designated duration 45, and refrains from transmission during this duration. This duration is called a transmission prohibition duration or a NAV duration. By setting NAV, transmission from the wireless communication terminal 2 is prohibited. Consequently, a possibility that the power reception terminal 3 receives the signal from the wireless communication terminal 2 can be reduced.

The power reception terminal 3 receives the wireless signal 44A transmitted from the base station 1, and charges the rechargeable battery 6 with the power of the received wireless signal 44A. The power reception terminal 3 receives the wireless signal 44B transmitted from the base station 1, and charges the rechargeable battery 6 with the power of the received wireless signal 44B.

The power reception terminal 3 measures a time "T2" until completion of receiving the wireless signal pertaining to the request of power feeding 41 (completion of power feeding pertaining the request of power feeding 41). Here, the time "T2" is a time from transmission of the request of power feeding 41 to completion of receiving the wireless signal 44B. The power reception terminal 3 determines the transmission timing of the next request of power feeding 42 on the basis of the measured time "T2". For example, it is assumed that a user of the power reception terminal 3 performs setting so as to complete charging the power reception terminal 3 by a predetermined time point or in a certain range duration with respect to the predetermined time point. In this case, the power reception terminal 3 determines a time point that is time-"T2"-before the predetermined time point, or a duration a certain time therebefore, as the transmission timing of the next request of power feeding. The amount of power to be fed or the number of transmissions requested by the request of power feeding is assumed to be the same as that of the request of power feeding 41. Accordingly, the power reception terminal 3 can be expected to complete charging of the rechargeable battery 6 by the predetermined time point or in the certain range duration with respect to the predetermined time point.

Third Specific Example

Figure 9:
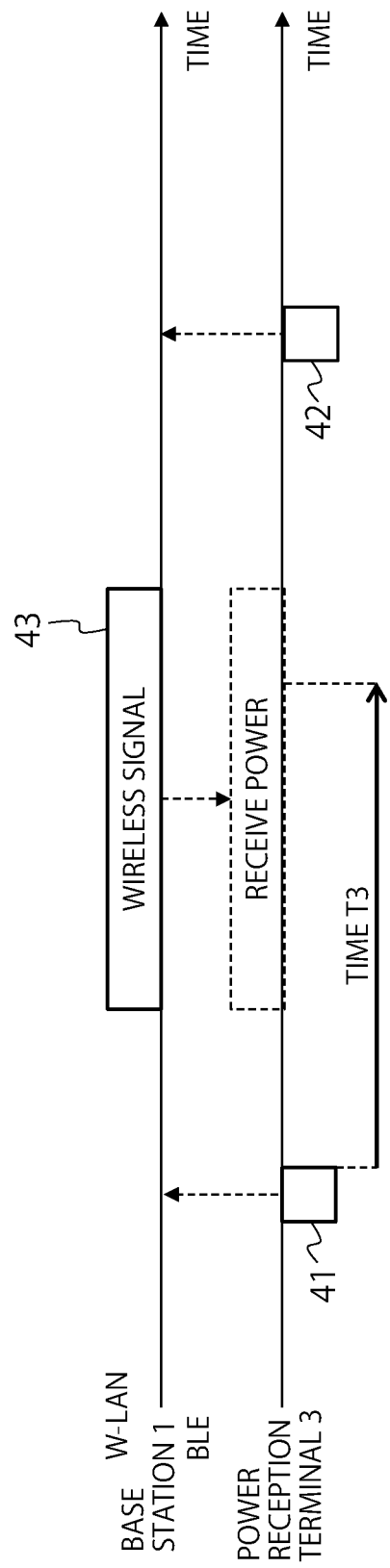
FIG. 9 is a diagram showing a third specific example of the operation sequence according to the first embodiment.

FIG. 9 shows a third specific example of the operation sequence in the wireless communication system according to this embodiment. The operations of the base station 1 and the power reception terminal 3 are indicated along temporal axes. The upper temporal axis indicates the operation of the wireless LAN, and the lower temporal axis indicates the operation of BLE. In this example, information indicating a time (fulfillment time) from transmission of the request of power feeding to the remaining amount of power of the rechargeable battery 6 reaching the target value is obtained, and the transmission timing of the next request of power feeding is determined on the basis of the obtained information. Description of the operation identical to that of the sequences of FIGS. 5 to 8 is appropriately omitted.

The power reception terminal 3 transmits the request of power feeding 41 through BLE at the predetermined timing. Here, it is assumed that the request of power feeding 41 is transmitted when the remaining amount of power of the rechargeable battery 6 becomes the threshold or less. The threshold is, for example, a value larger than the minimum amount of power of the rechargeable battery 6.

The power reception terminal 3 receives the wireless signal 43 transmitted from the base station 1 in response to the request of power feeding 41.

The power reception terminal 3 charges the rechargeable battery 6 on the basis of the wireless signal 43. The power reception terminal 3 measures the time (fulfillment time) "T3" until the remaining amount of power of the rechargeable battery 6 reaches the target value. The target value may be, for example, a predetermined ratio to the capacity of the rechargeable battery, such as 80% of the capacity of the rechargeable battery, or a value set by a user of the power reception terminal 3. According to the example in the diagram, in the middle of reception of the wireless signal 43, the remaining amount of power of the rechargeable battery 6 reaches the target value. The power reception terminal 3 measures the time after transmission of the request of power feeding 41 to the target value being reached, and adopts the measured time as the fulfillment time "T3". The fulfillment time "T3" can be regarded as a time required for charging with the amount of power having a value obtained by subtracting the threshold from the target value after transmission of the request of power feeding. The power reception terminal 3 determines the transmission timing of the next request of power feeding 42 on the basis of the fulfillment time "T3".

For example, it is assumed that the user of the power reception terminal 3 intends to make the remaining amount of power of the rechargeable battery 6 have the target value or higher by the predetermined time point. The power feeding amount designated by the request of power feeding 42 is assumed to be the same as the power feeding amount designated by the request of power feeding 41. Likewise, this applies to the threshold. In this case, the power reception terminal 3 determines a time point fulfillment-time-"T3"-before the predetermined time point or thereafter, as the transmission timing of the next request of power feeding 42. By transmitting the request of power feeding 42 at the transmission time point determined as described above, it can be expected to make the remaining amount of power of the rechargeable battery 6 have a value equal to or higher than the target value by the predetermined time point. Here, the power feeding amount designated by the request of power feeding 42 is assumed to be the same as the power feeding amount designated by the request of power feeding 41. However, only if the amount is the amount of power ranging from the threshold to the target value, the amount is not necessarily the same.

The case where the power reception terminal 3 performs charging only for the wireless signal 43 received from the base station 1 has been described. However, in some cases, the power reception terminal 3 also receives another signal transmitted from the base station 1, or a signal transmitted from the wireless communication terminal 2, or a signal transmitted from another system, through the antenna 31 for power feeding. In such cases, the power of the received signal is charged in the rechargeable battery 6. The power reception terminal 3 may exclude the charging through the signals other than the wireless signal destined for the terminal itself from the amounts of received power to be measured, and may only adopt the power charged through the wireless signal destined for the terminal itself as the target of measurement for time "T3". This case equivalently means that the target value is increased by the amount of power charged through signals other than the signal destined for the terminal itself. Alternatively, the signals other than the signal destined for the terminal itself may be included as the targets of measurement for the time "T3". If it is assumed that communications therearound other than the terminal itself has periodicity, signals other than the wireless signal of the terminal itself can be included as the targets of measurement for time "T3". In this case, the amount of power to be fed requested from the base station 1 can be also reduced. Alternatively, the received signals other than the wireless signal for the terminal itself may be assumed as faint signals, and charging through these faint signals may be ignored.

Fourth Specific Example

Figure 10:
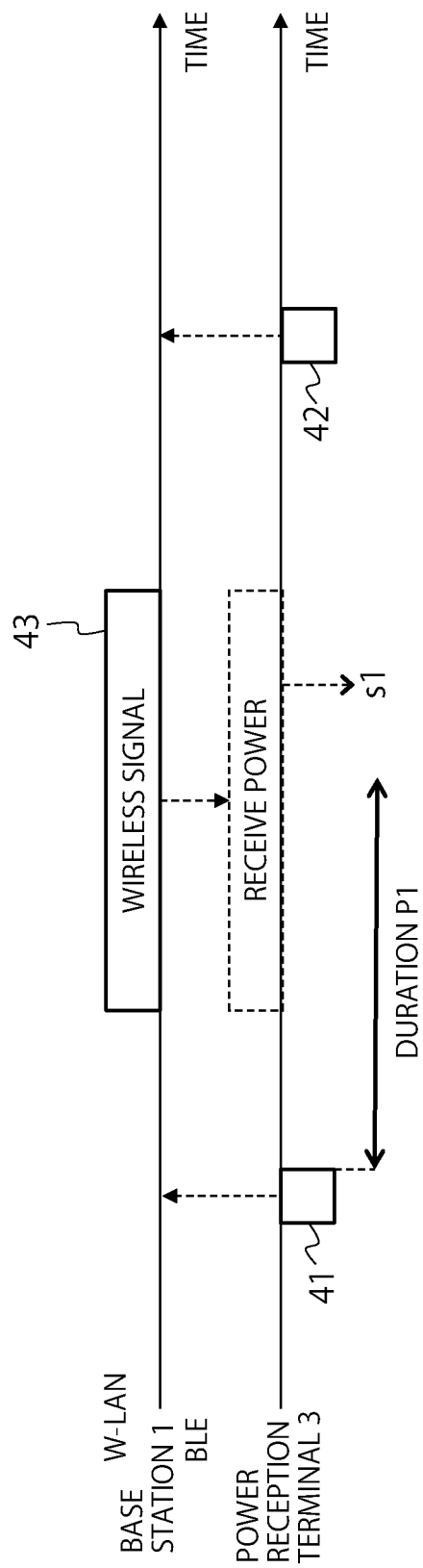
FIG. 10 is a diagram showing a fourth specific example of the operation sequence according to the first embodiment.

FIG. 10 shows a fourth specific example of the operation sequence in the wireless communication system according to this embodiment. The operations of the base station 1 and the power reception terminal 3 are indicated along temporal axes. The upper temporal axis indicates the operation of the wireless LAN, and the lower temporal axis indicates the operation of BLE. In this example, information indicating whether the remaining amount of power of the rechargeable battery 6 reaches at least the target value or not is obtained in a duration "P1" having a predetermined length after the power reception terminal 3 transmitted the request of power feeding, and the transmission timing of the next request of power feeding is determined on the basis of the obtained information. Description of the operation identical to that of the sequences of FIGS. 5 to 9 is appropriately omitted.

The power reception terminal 3 transmits the request of power feeding 41 through BLE. Here, it is assumed that the request of power feeding 41 is transmitted when the remaining amount of power of the rechargeable battery 6 becomes the threshold or less. The threshold is, for example, a value larger than the minimum amount of power of the rechargeable battery 6.

The power reception terminal 3 receives the wireless signal 43 transmitted from the base station 1 in response to the request of power feeding 41.

The power reception terminal 3 receives the wireless signal 43 transmitted from the base station 1, and charges the rechargeable battery 6 on the basis of the received wireless signal 43.

The power reception terminal 3 determines whether or not the remaining amount of power of the rechargeable battery 6 reaches at least the target value in the duration "P1" having the predetermined length by charging based on the wireless signal 43.

The power reception terminal 3 determines the transmission timing of the next request of power feeding 42 on the basis of whether or not the remaining amount of power reaches at least the target value in the duration "P1". According to the example in the diagram, a time point when the target value is reached is a time point "s1". The "s1" is after the duration "P1". That is, the remaining amount of power of the rechargeable battery 6 does not reach the target value or higher in the duration "P1". Accordingly, the power reception terminal 3 determines the transmission timing of the next request of power feeding 42 so that the remaining amount of power can reach the target value or higher in the duration "P1" having the predetermined length.

Specifically, the threshold for transmitting the request of power feeding is set to be high, for example. For example, the amount of power consumption of the power reception terminal 3 for a time obtained by subtracting the end time point of the duration "P1" from the time point "s1" is calculated, and the calculated amount of power consumption or a value higher than this amount is set as the threshold. Alternatively, a time in which the calculated value of the amount of power consumption or a higher value is reached may be calculated on the basis of the operation power consumption of the power reception terminal 3, and a time point the calculated time after the current time point may be adopted as the transmission time point of the request of power feeding 42.

By thus determining the transmission timing of the request of power feeding 42, it can be expected that the remaining amount of power can become the target value or higher in the duration "P1" having the predetermined length after transmission of the request of power feeding 42.

Fifth Specific Example

Figure 11:
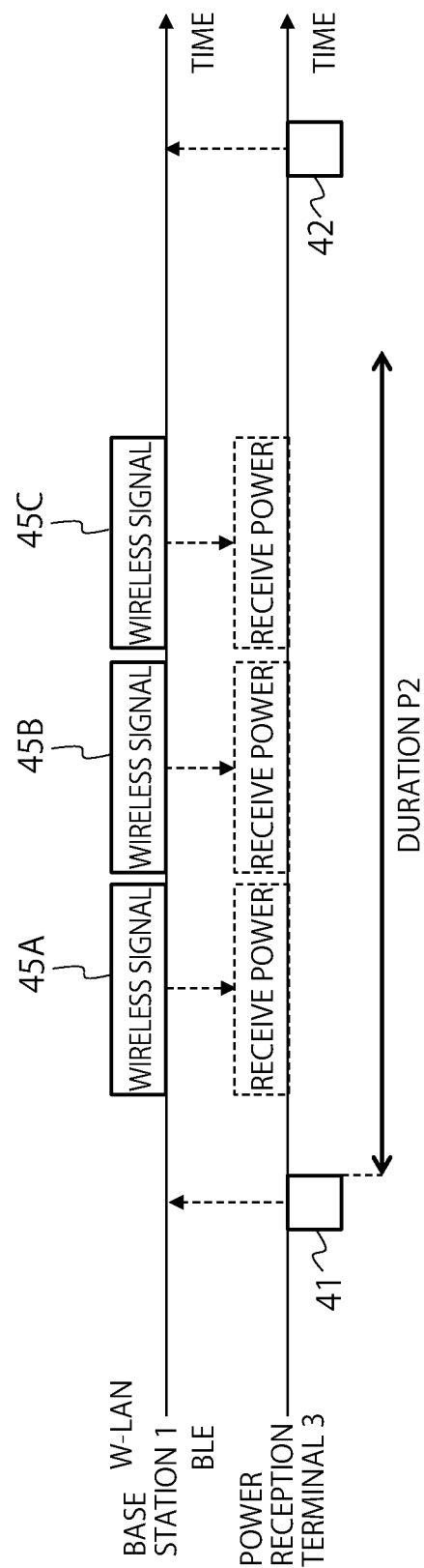
FIG. 11 is a diagram showing a fifth specific example of the operation sequence according to the first embodiment.

FIG. 11 shows a fifth specific example of the operation sequence in the wireless communication system according to this embodiment. The operations of the base station 1 and the power reception terminal 3 are indicated along temporal axes. The upper temporal axis indicates the operation of the wireless LAN, and the lower temporal axis indicates the operation of BLE. In this example, information indicating the number of receptions of the wireless signal (the number of power feeding times) is obtained in a duration "P2" having a predetermined length after transmission of the request of power feeding, and the transmission timing of the next request of power feeding is determined on the basis of the obtained information. Description of the operation identical to that of the sequences of FIGS. 5 to 10 is appropriately omitted.

The power reception terminal 3 transmits the request of power feeding 41 through BLE at the predetermined timing.

The base station 1 receives the request of power feeding 41 through BLE, and interprets the request of power feeding 41. Here, the request of power feeding 41 designates the amount of transmission power (power feeding amount). The base station 1 determines the number of transmissions and the length of the wireless signal on the basis of the information designated by the request of power feeding 41. Here, it is assumed to determine to transmit the wireless signal three times, and to determine the length having the same length.

The base station 1 sequentially transmits a wireless signal 45A, a wireless signal 45B and a wireless signal 45C. The access right to the wireless medium may be separately obtained, and transmission may be performed on the basis of the obtained access right. Alternatively, the aforementioned CTS-to-self frame may be transmitted, and TXOP having at least the duration length may be obtained to transmit the three wireless signals at predetermined time intervals.

The power reception terminal 3 sequentially receives the wireless signal 45A, the wireless signal 45B and the wireless signal 45C transmitted from the base station 1, and charges the rechargeable battery 6 on the basis of these received wireless signals.

The power reception terminal 3 measures the number of receptions of the wireless signal in the duration "P2" having the predetermined length after transmission of the request of power feeding 41. Here, the three wireless signals are received in the duration "P2". Accordingly, the number of receptions is three. If the duration "P2" elapses in the middle of the reception of the wireless signal, the reception of this wireless signal is excluded from the counting target. Alternatively, if a signal having a length of a certain ratio of the wireless signal length or higher is received in the duration "P2", the reception of this wireless signal may be included as the counting target.

If the length of one wireless signal is determined, the power feeding amount can be calculated from the number of receptions. The power reception terminal 3 determines the transmission timing of the next request of power feeding 42 on the basis of the calculated number of receptions.

Specifically, the threshold for transmitting the request of power feeding is changed, for example. For example, the amount of power received in the duration "P2" is calculated by multiplying the calculated number of receptions and the amount of received power of the wireless signal per reception together. A value obtained by subtracting the calculated amount of power from the target value of the amount of power of the rechargeable battery 6 or a higher value is set as the threshold. Alternatively, a time until the current remaining amount of power reaches the value obtained by subtracting the calculated amount of power or a higher value is calculated on the basis of the operation power consumption of the power reception terminal 3. A time point the calculated time after the current time point may be determined as the transmission time point of the request of power feeding 42.

Sixth Specific Example

Figure 12:
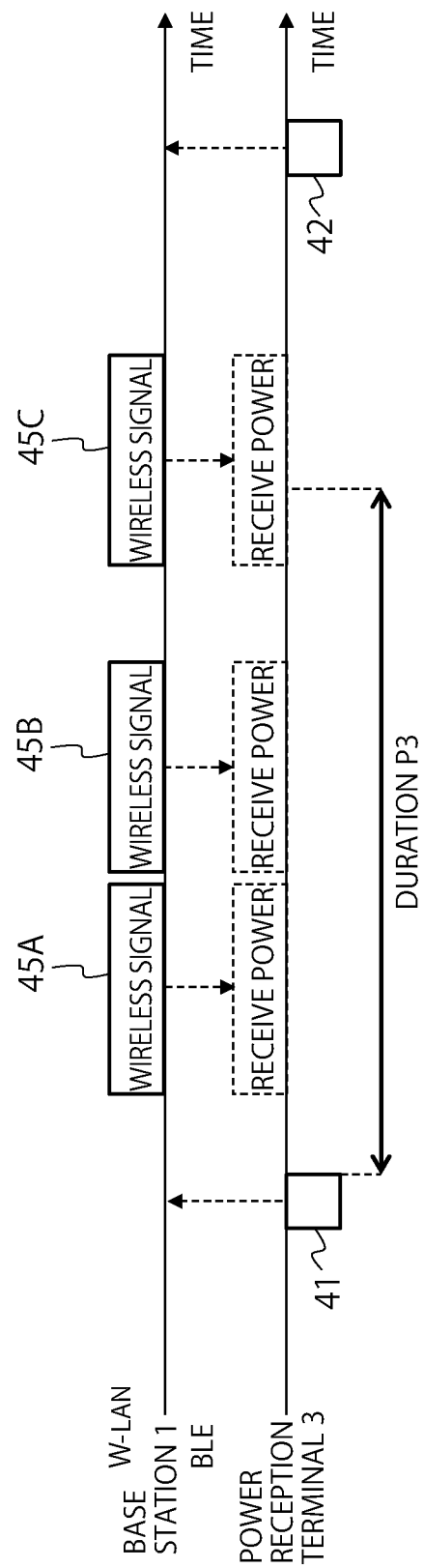
FIG. 12 is a diagram showing a sixth specific example of the operation sequence according to the first embodiment.

FIG. 12 shows a sixth specific example of the operation sequence in the wireless communication system according to this embodiment. The operations of the base station 1 and the power reception terminal 3 are indicated along temporal axes. The upper temporal axis indicates the operation of the wireless LAN, and the lower temporal axis indicates the operation of BLE. In this example, information indicating the ratio of the reception time of the wireless signal (power feeding time) in a duration "P3" having a predetermined length after transmission of the request of power feeding is obtained, and the transmission timing of the next request of power feeding is determined on the basis of the obtained information. Description of the operation identical to that of the sequences of FIGS. 5 to 11 is appropriately omitted.

The power reception terminal 3 transmits the request of power feeding 41 through BLE at the predetermined timing.

The base station 1 receives the request of power feeding 41 through BLE, and analyzes the request of power feeding 41. Here, it is assumed that the request of power feeding 41 designates the amount of transmission power (power feeding amount), and the base station 1 determines the number of transmissions and the length of the wireless signal on the basis of the information designated by the request of power feeding 41. Here, it is assumed to determine to transmit the wireless signal three times, and to determine the length appropriately.

The base station 1 sequentially transmits the wireless signal 45A, the wireless signal 45B and the wireless signal 45C.

The power reception terminal 3 sequentially receives the wireless signal 45A, the wireless signal 45B and the wireless signal 45C transmitted from the base station 1, and charges the rechargeable battery 6 on the basis of these received wireless signals.

The power reception terminal 3 measures the time ratio of reception of the wireless signal in the duration "P3" having the predetermined length after transmission of the request of power feeding 41. Here, the wireless signal 45A, the wireless signal 45B, and a part of the wireless signal 45C are received in the duration "P3". The power reception terminal 3 calculates the ratio (power feeding time ratio) by dividing the total of the received wireless signal 45A, the wireless signal 45B and the part of the wireless signal 45C by the length of the duration "P3".

The power reception terminal 3 determines the transmission timing of the next request of power feeding 42 on the basis of the calculated power feeding time ratio.

Specifically, the threshold for transmitting the request of power feeding is changed, for example. For example, the amount of power consumption is calculated by multiplying the time length of the power feeding ratio duration "P3" by the operation power consumption of the power reception terminal 3.

A value obtained by subtracting the calculated amount of power consumption from the target value of the amount of power of the rechargeable battery 6 or a higher value is set as the threshold. Alternatively, a time until the current remaining amount of power reaches the value obtained by subtracting the calculated amount of power consumption or a higher value is calculated. A time point the calculated time after the current time point may be determined as the transmission time point of the request of power feeding 42.

Modification Example

In the embodiment described above, the power reception terminal 3 determines the transmission timing of the next request of power feeding on the basis of the reception history of the wireless signal after transmission of one request of power feeding. Alternatively, the transmission timing of the next request of power feeding may be determined on the basis of the reception history (charging history) of the wireless signal after previous transmissions of the requests of power feeding. For example, in the case of the first specific example, the transmission timing of the next request of power feeding may be determined using the average value of the power feeding response times in response to the requests of power feeding transmitted previous X (X is an integer of two or more) times. Likewise, this modification example is applicable to the second to sixth specific examples.

Second Embodiment

Figure 13:
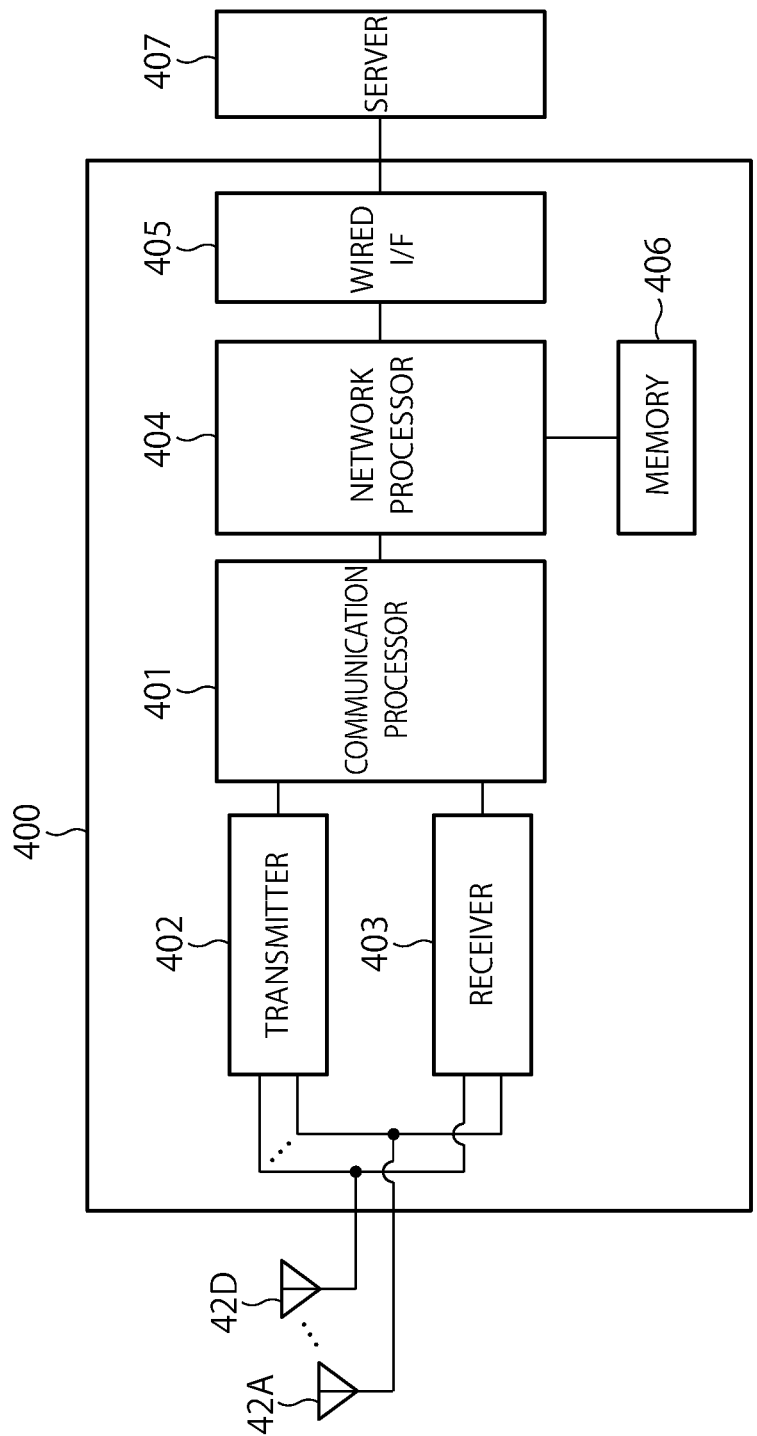
FIG. 13 is a functional block diagram of an access point or a terminal.

FIG. 13 is a functional block diagram of a base station (access point) 400 according to the present embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The network processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 13. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Third Embodiment

Figure 14:
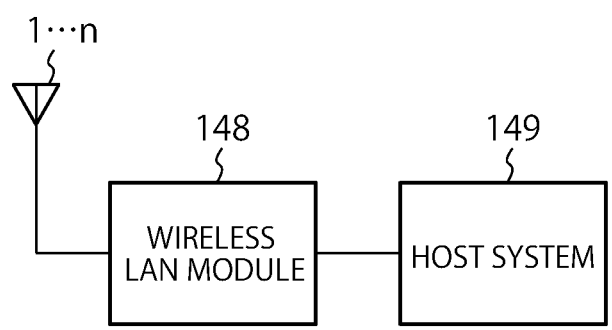
FIG. 14 is a diagram showing an example of the overall configuration of the terminal or the access point.

FIG. 14 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 15:
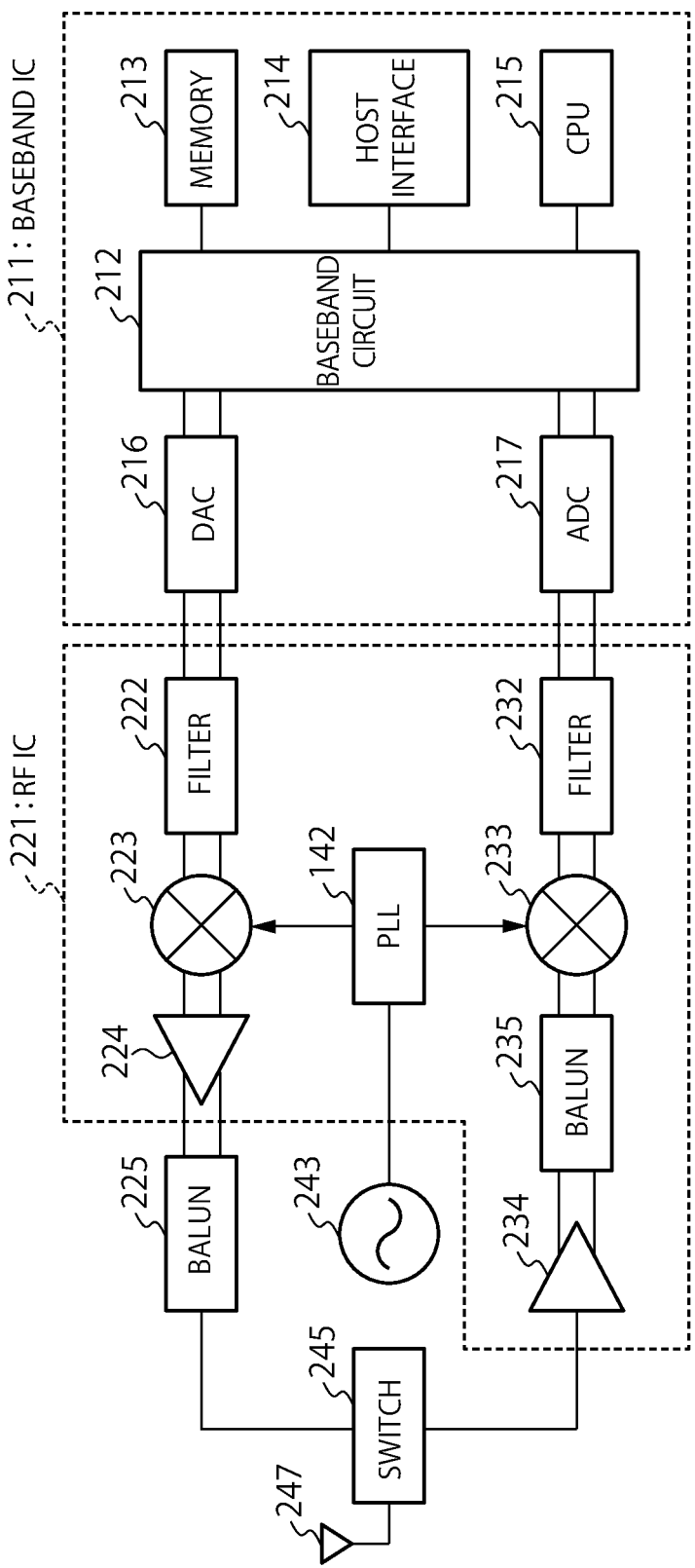
FIG. 15 is a diagram showing a hardware configuration example of a wireless communication device mounted on the terminal or the access point.

FIG. 15 shows an example of hardware configuration of an access point (base station), a WLAN terminal or a BLE terminal. When the WLAN and the BLE terminal are both provided, the configuration shown in the figure may be provided for each case and may be mounted. The functions of the WLAN and BLE may be mounted in one chip or may be arranged in a dispersed manner in different chips. All of elements shown in the figure are not required to be provided, a part of elements may be omitted or replaced, and another element may be added.

In the configuration shown in figure, at least one antenna 247 is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The antenna 247 may be a phased array antenna or a directivity variable antenna.

Fourth Embodiment

FIG. 16 is a functional block diagram of the terminal (STA) 500 according to the present embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to the controller as described in the first embodiment. The transmitter 502 and the receiver 503 have the functions similar to the transmitter and the receiver as described in the first embodiment. The transmitter 502 and the receiver 503 may perform analog domain processing in the transmitter and the receiver as described in the first embodiment and the communication processor 501 may perform digital domain processing in the transmitter and the receiver as described in the first embodiment. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500.

The second wireless communication module 506 have the similar configuration to the WLAN module as shown in FIG. 14 or FIG. 15 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

Fifth Embodiment

Figure 17A:
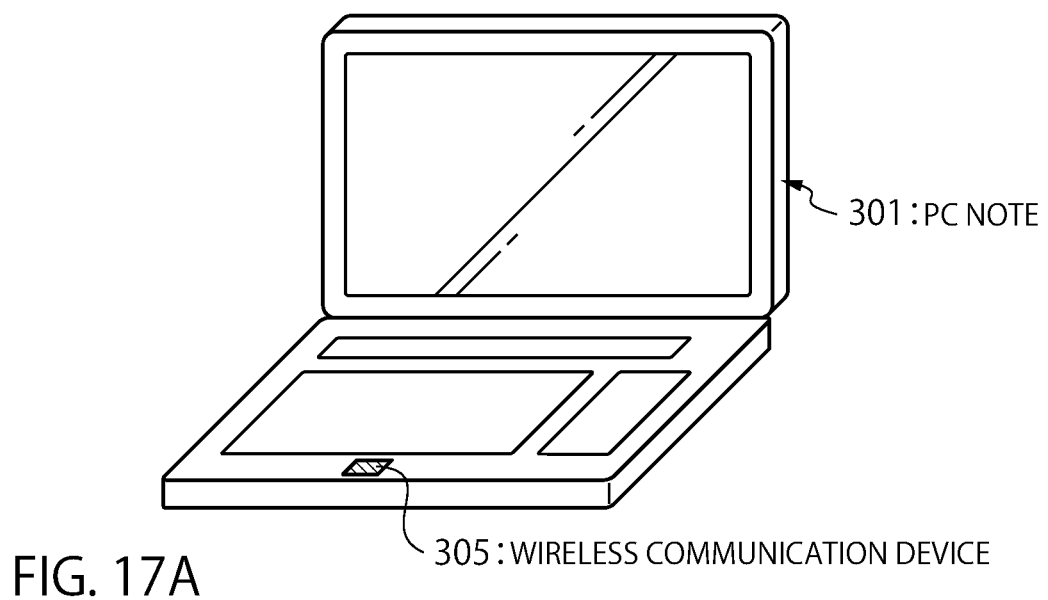
FIGS. 17A and 17B each is a perspective view of the terminal according to the embodiment of the present invention.
Figure 17B:
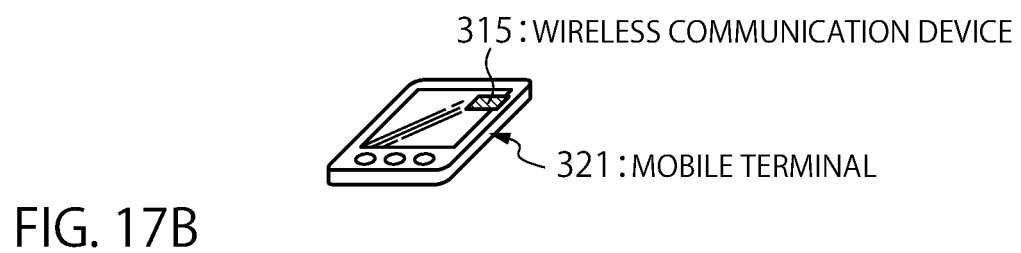

FIG. 17A and FIG. 17B are perspective views of wireless terminal according to the third embodiment. The wireless terminal in FIG. 17A is a notebook PC 301 and the wireless communication device (or a wireless device) in FIG. 17B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 18:
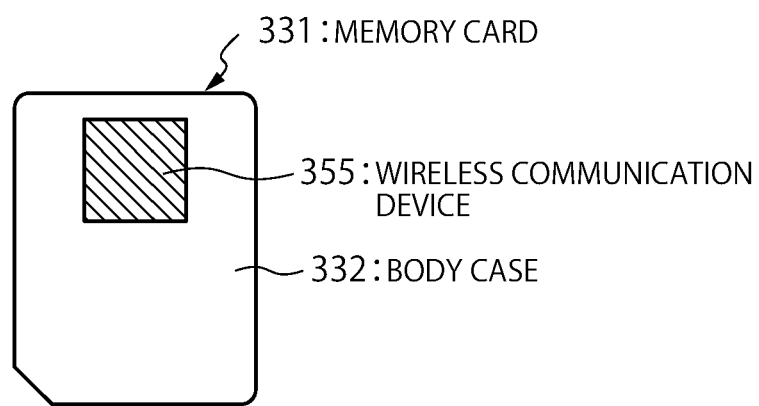
FIG. 18 is a diagram showing a memory card according to the embodiment of the present invention.

Moreover, a wireless communication device installed in a terminal (which may indicate a base station) can also be provided in a memory card. FIG. 18 illustrates an example of a wireless communication device mounted on a memory card. A memory card 331 contains a wireless communication device 355 and a body case 332. The memory card 331 uses the wireless communication device 355 for wireless communication with external devices. Here, in FIG. 18, the description of other installed elements (for example, a memory, and so on) in the memory card 331 is omitted.

Sixth Embodiment

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Seventh Embodiment

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eighth Embodiment

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Ninth Embodiment

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Tenth Embodiment

In the present embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Eleventh Embodiment

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Twelfth Embodiment

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Thirteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Fourteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 19:
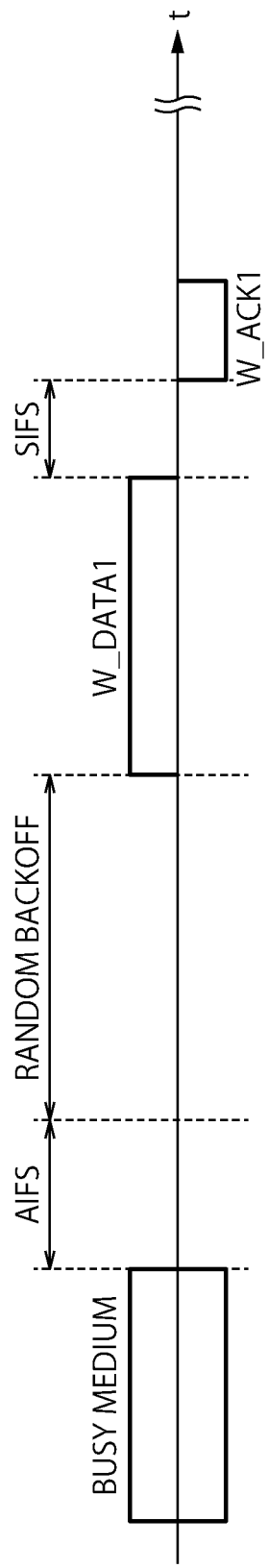
FIG. 19 is a diagram showing one example of frame exchange in a contention duration.

Here, FIG. 19 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller (controlling circuitry), a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:
1. An electronic apparatus, comprising:
transmission circuitry configured to transmit a first request of power feeding;
power reception circuitry configured to receive a first wireless signal of power feeding in response to the first request, and charge a rechargeable battery with a power from the first wireless signal; and
controlling circuitry configured to measure a length of time between the reception of the first wireless signal and the transmission of the first request and to determine a transmission timing of a second request of power feeding based on the measured length of time,
wherein the transmission circuitry is configured to transmit the second request when a remaining amount of power of the rechargeable battery becomes a threshold or less at the transmission timing,
wherein the controlling circuitry is configured to determine the transmission timing of the second request by changing the threshold.
2. The electronic apparatus according to claim 1,
wherein the controlling circuitry is configured to determine the transmission timing of the second request of power feeding, based on a time length by which an amount of power of the rechargeable battery reaches a target value after the first request of power feeding is transmitted.
3. The electronic apparatus according to claim 1,
wherein the controlling circuitry is configured to determine the transmission timing of the second request of power feeding, based on whether an amount of power of the rechargeable battery reaches a target value in a predetermined duration after the first request of power feeding is transmitted.
4. The electronic apparatus according to claim 1,
wherein the controlling circuitry is configured to determine the transmission timing of the second request of power feeding, based on a reception history of a plurality of the first wireless signals in response to a plurality of transmissions of the first request of power feeding.
5. The electronic apparatus according to claim 1,
wherein the controlling circuitry is configured to determine a time point or a duration of transmitting the second request of power feeding, as the transmission timing, and
the transmission circuitry is configured to transmit the second request of power feeding at the determined time point or in the determined duration.
6. The electronic apparatus according to claim 1,
wherein at least one of the first request of power feeding and the second request of power feeding includes at least one of a transmission time length of the wireless signal, a number of transmissions of the wireless signal, and a transmission power of the wireless signal.
7. The electronic apparatus according to claim 1, further comprising
the rechargeable battery.
8. The electronic apparatus according to claim 1,
wherein the rechargeable battery is a rechargeable battery or a capacitor.
9. The electronic apparatus according to claim 1, further comprising
at least one antenna.

10. An electronic apparatus, comprising:
transmission circuitry configured to transmit a first request of power feeding;
power reception circuitry configured to receive a first wireless signal of power feeding in response to the first request, and charge a rechargeable battery with a power from the first wireless signal; and
controlling circuitry configured to measure a length of time between the transmission of the first request of power feeding and an end of the power feeding of the first wireless signal and to determine a transmission timing of a second request of power feeding based on the length of time;
wherein the transmission circuitry is configured to transmit the second request when a remaining amount of power of the rechargeable battery becomes a threshold or less at the transmission timing,
wherein the controlling circuitry is configured to determine the transmission timing of the second request by changing the threshold.
11. An electronic apparatus, comprising:
transmission circuitry configured to transmit a first request of power feeding;
power reception circuitry configured to receive wireless signals of power feeding in response to the first request, and charge a rechargeable battery with a power from the wireless signals; and
controlling circuitry configured to measure a number of the wireless signals received after the first request of power feeding is transmitted and to determine a transmission timing of a second request of power feeding based on the number of the wireless signals,
wherein the transmission circuitry is configured to transmit the second request when a remaining amount of power of the rechargeable battery becomes a threshold or less at the transmission timing,
wherein the controlling circuitry is configured to determine the transmission timing of the second request by changing the threshold.
12. An electronic apparatus, comprising:
transmission circuitry configured to transmit a first request of power feeding;
power reception circuitry configured to receive a first wireless signal of power feeding in response to the first request, and charge a rechargeable battery with a power from the first wireless signal; and
controlling circuitry configured to measure a ratio of a time during which the first wireless signal is received to a first duration after the first request of power feeding is transmitted, and to determine a transmission timing of a second request of power feeding, based on the ratio,
wherein the transmission circuitry is configured to transmit the second request when a remaining amount of power of the rechargeable battery becomes a threshold or less at the transmission timing,
wherein the controlling circuitry is configured to determine the transmission timing of the second request by changing the threshold.
13. A wireless communication method performed by an electronic apparatus, comprising:
transmitting a first request of power feeding;
receiving a first wireless signal in response to the first request of power feeding;
charging a rechargeable battery with a power from the first wireless signal;

measuring a length of time between the reception of the first wireless signal and the transmission of the first request;
determining a transmission timing of a second request of power feeding based on the measured length of time; and
transmitting the second request at the transmission timing,
wherein the determining the transmission timing of the second request comprises determining the transmission timing of the second request of power feeding, based on a time length by which an amount of power of the rechargeable battery reaches a target value after the first request of power feeding is transmitted.

14. A wireless communication method performed by an electronic apparatus, comprising:
transmitting a first request of power feeding;
receiving a first wireless signal of power feeding in response to the first request, and charging a rechargeable battery with a power from the first wireless signal; and
measuring a length of time between the transmission of the first request of power feeding and an end of the power feeding of the first wireless signal;
determining the transmission timing of the second request, based on the measured length of time; and
transmitting the second request at the transmission timing,
wherein the determining the transmission timing of the second request comprises determining the transmission timing of the second request of power feeding, based on a time length by which an amount of power of the rechargeable battery reaches a target value after the first request of power feeding is transmitted.

15. A wireless communication method performed by an electronic apparatus, comprising:
transmitting a first request of power feeding;
receiving wireless signals of power feeding in response to the first request, and charging a rechargeable battery with a power from the wireless signals;
measuring a number of the wireless signals received after the first request of power feeding is transmitted;
determining a transmission timing of the second request of power feeding, based on the measured number of the wireless signals; and
transmitting the second request at the transmission timing,
wherein the determining the transmission timing of the second request comprises determining the transmission timing of the second request of power feeding, based on a time length by which an amount of power of the rechargeable battery reaches a target value after the first request of power feeding is transmitted.

16. A wireless communication method performed by an electronic apparatus, comprising:
transmitting a first request of power feeding;
receiving a first wireless signal of power feeding in response to the first request, and charging a rechargeable battery with a power from the first wireless signal;
measuring a ratio of a time during which the first wireless signal is received to a first duration after the first request of power feeding is transmitted;
determining a transmission timing of a second request of power feeding, based on the measured ratio; and
transmitting the second request at the transmission timing,
wherein the determining the transmission timing of the second request comprises determining the transmission timing of the second request of power feeding, based on a time length by which an amount of power of the rechargeable battery reaches a target value after the first request of power feeding is transmitted.

\* \* \* \* \*